US012599887B2

(12) United States Patent

Khankal et al.

(10) Patent No.: US 12,599,887 B2

(45) Date of Patent: Apr. 14, 2026

(54) LOOP SLURRY REACTOR COOLING PROCESSES AND SYSTEMS

(71) Applicant: Chevron Phillips Chemical Company LP, The Woodlands, TX (US)

(72) Inventors: Reza Khankal, Kingwood, TX (US); James E. Hein, Kingwood, TX (US); Anurag Gupta, Kingwood, TX (US); Enrique J. Mancillas, Kingwood, TX (US); Timothy O. Odi, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 132 days.

(21) Appl. No.: 18/598,472

(22) Filed: Mar. 7, 2024

(65) Prior Publication Data

US 2024/0207803 A1　Jun. 27, 2024

Related U.S. Application Data

(63) Continuation of application No. 17/063,844, filed on Oct. 6, 2020, now Pat. No. 12,076,700.

(51) Int. Cl.
| | |
|---|---|
| *B01J 19/00* | (2006.01) |
| *B01J 19/06* | (2006.01) |
| *B01J 19/24* | (2006.01) |
| *C08F 2/01* | (2006.01) |

(52) U.S. Cl.
CPC .......... *B01J 19/0013* (2013.01); *B01J 19/06* (2013.01); *B01J 19/2465* (2013.01); *C08F 2/01* (2013.01); *B01J 2219/00094* (2013.01)

(58) Field of Classification Search
USPC ............................................. 526/64; 422/138
See application file for complete search history.

(56) References Cited

U.S. PATENT DOCUMENTS

| | | | |
|---|---|---|---|
| 3,229,754 | A | 1/1966 | Hoag |
| 4,402,914 | A | 9/1983 | Eckhoff |
| 6,235,852 | B1 | 5/2001 | Hess |
| 6,753,387 | B1 | 6/2004 | Tait |

(Continued)

FOREIGN PATENT DOCUMENTS

| | | |
|---|---|---|
| CN | 101232939 A | 7/2008 |
| CN | 101952026 A | 1/2011 |

(Continued)

OTHER PUBLICATIONS

Foreign Communication from Related Application—First Chinese Office Action with English Translation, Application No. 202180062545.3, dated Aug. 18, 2025, 18 pages total.

*Primary Examiner* — Fred M Teskin

(74) *Attorney, Agent, or Firm* — Conley Rose, P.C.

(57) ABSTRACT

Disclosed are systems and processes for distributing reactor coolant flow to the cooling jackets of a loop slurry reactor, where the reactor coolant is used to control the temperature of the loop slurry reactor in olefin polymerization. Also disclosed are systems and processes for controlling the temperature of the reactor coolant that is used for cooling olefin polymerization reactors, which can be used in combination with traditional coolant distribution regimes and in combination with the coolant distribution systems and processes that are disclosed herein.

20 Claims, 8 Drawing Sheets

(56)           References Cited

U.S. PATENT DOCUMENTS

| | | |
|---|---|---|
| 7,473,744 B2 | 1/2009 | Chenoweth |
| 7,678,341 B2 | 3/2010 | Smith |
| 8,273,299 B2 | 9/2012 | Parisel |
| 8,406,928 B2 | 3/2013 | Gupta |
| 9,624,316 B2 | 4/2017 | Odi |
| 9,789,463 B2 | 10/2017 | Kufeld |
| 2007/0022788 A1 | 2/2007 | Smith |
| 2011/0300025 A1* | 12/2011 | McElvain ............... C08F 6/003 |
| | | 422/138 |
| 2017/0152327 A1 | 6/2017 | Odi et al. |
| 2017/0306059 A1 | 10/2017 | Odi et al. |
| 2019/0083950 A1 | 3/2019 | Schwerdtfeger |

FOREIGN PATENT DOCUMENTS

| | | |
|---|---|---|
| CN | 106999899 A | 8/2017 |
| EP | 0516037 A2 | 12/1992 |
| WO | 2016063043 A2 | 4/2016 |
| WO | 2022076968 A1 | 4/2022 |

* cited by examiner

LOOP SLURRY REACTOR COOLING PROCESSES AND SYSTEMS

CROSS-REFERENCE TO RELATED APPLICATIONS

The present application is a continuation of and claims priority to U.S. patent application Ser. No. 17/063,844 filed Oct. 6, 2020, now U.S. Pat. No. 12,076,700 B2, which is hereby incorporated by refence in its entirety.

TECHNICAL FIELD

The present disclosure relates to cooling of a loop slurry reactor in olefin polymerization.

BACKGROUND

Polyolefins can be prepared by polymerization of an olefin monomer in a polymerization reactor in which feed materials such as the olefin monomer, an olefin comonomer, catalyst, activator, chain transfer agent, and catalyst diluent are introduced. The polymerization reaction within the reactor yields polyolefin as part of a polymerization product.

Catalyzed olefin polymerization reactions are generally exothermic; thus, to operate an olefin polymerization below a desired temperature and/or within a desired temperature range (e.g., such as below a temperature at which the product polymer melts and/or fouls equipment and within a range that provides a uniform polyolefin product), heat generated by the polymerization reaction is removed from the reactor. In the case of loop slurry reactors, cooling jackets are placed around vertical legs of the loop slurry reactor, and a coolant flows through the cooling jackets during polymerization so as to remove the heat of reaction generated by the exothermic polymerization.

The coolant warmed by the heat removed from the reactor is cooled in a heat exchanger, and after cooling, is returned to the cooling jackets. A continuous flow of coolant is supplied to the cooling jackets to absorb reaction heat and then is cooled by the heat exchanger in a coolant circuit.

As the size of commercial polyolefin manufacturing plants increases to meet global demand, so do the cooling needs of the polymerization reactors. In some cases of loop slurry reactors, the reactors are so large that previously used techniques for cooling have large pipes and result in overly complex configurations for the coolant circuit.

SUMMARY

A process for cooling a plurality of vertical legs in a loop slurry reactor, the loop slurry reactor having a first side opposite of a second side and a third side opposite of a fourth side, wherein the first side and the second side are perpendicular to the third side and the fourth side, the process comprising flowing coolant to a first coolant supply header extending along the first side of the loop slurry reactor; flowing coolant from a first coolant return header extending along the second side of the loop slurry reactor; and flowing coolant from the first coolant supply header to the first coolant return header via a first plurality of coolant passes; wherein each of the first plurality of coolant passes is configured to i) exchange heat with a first pair of the plurality of vertical legs, ii) receive coolant from the first coolant supply header on the first side of the loop slurry reactor, and iii) return coolant to the first coolant return header on the second side of the loop slurry reactor.

A coolant distribution system for a plurality of vertical legs in a loop slurry reactor, wherein the loop slurry reactor has a first side opposite a second side and a third side opposite a fourth side, wherein the first side and the second side are perpendicular to the third side and the fourth side, the coolant distribution system comprising: a first coolant supply header extending along the first side of the loop slurry reactor; a first coolant return header extending along the second side of the loop slurry reactor; and a first plurality of coolant passes; wherein each of the first plurality of coolant passes is configured to i) exchange heat with a first pair of the plurality of vertical legs, ii) receive coolant from the first coolant supply header on the first side of the loop slurry reactor, and iii) return coolant to the first coolant return header on the second side of the loop slurry reactor.

A process for controlling temperature of a coolant in olefin polymerization, the process comprising: flowing a temperature adjusted coolant through a first plurality of cooling jackets and then a second plurality of cooing jackets to form a warmed coolant, wherein the first plurality of cooling jackets and the second plurality of cooling jackets are placed around a plurality of vertical legs of a loop slurry reactor; flowing the warmed coolant from the second plurality of cooling jackets to a heat exchanger; cooling the warmed coolant in the heat exchanger to form a cooled coolant; passing the cooled coolant through a steam heater to form the temperature adjusted coolant; and flowing the temperature adjusted coolant to the first plurality of cooling jackets; wherein the heat exchanger and the steam heater are fluidly coupled to one another in series and not in parallel with respect to the direction of flow of the coolant through the heat exchanger and the steam heater.

A temperature control system for a coolant in olefin polymerization, the temperature control system comprising: a coolant return conduit coupled to a first plurality of cooling jackets of a loop slurry reactor; a heat exchanger connected to the coolant return conduit and configured to cool warmed coolant received from the coolant return conduit to form a cooled coolant; a steam heater coupled to the heat exchanger and configured to i) heat the cooled coolant to form a temperature adjusted coolant, or ii) allow the cooled coolant to pass through without heating to form the temperature adjusted coolant; and a coolant supply conduit coupled to the steam heater and to a second plurality of cooling jackets of the loop slurry reactor, wherein the first plurality of cooling jackets are fluidly coupled to the second plurality of cooling jackets; wherein the heat exchanger and the steam heater are connected in series and not in parallel.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

3

Figure 1:
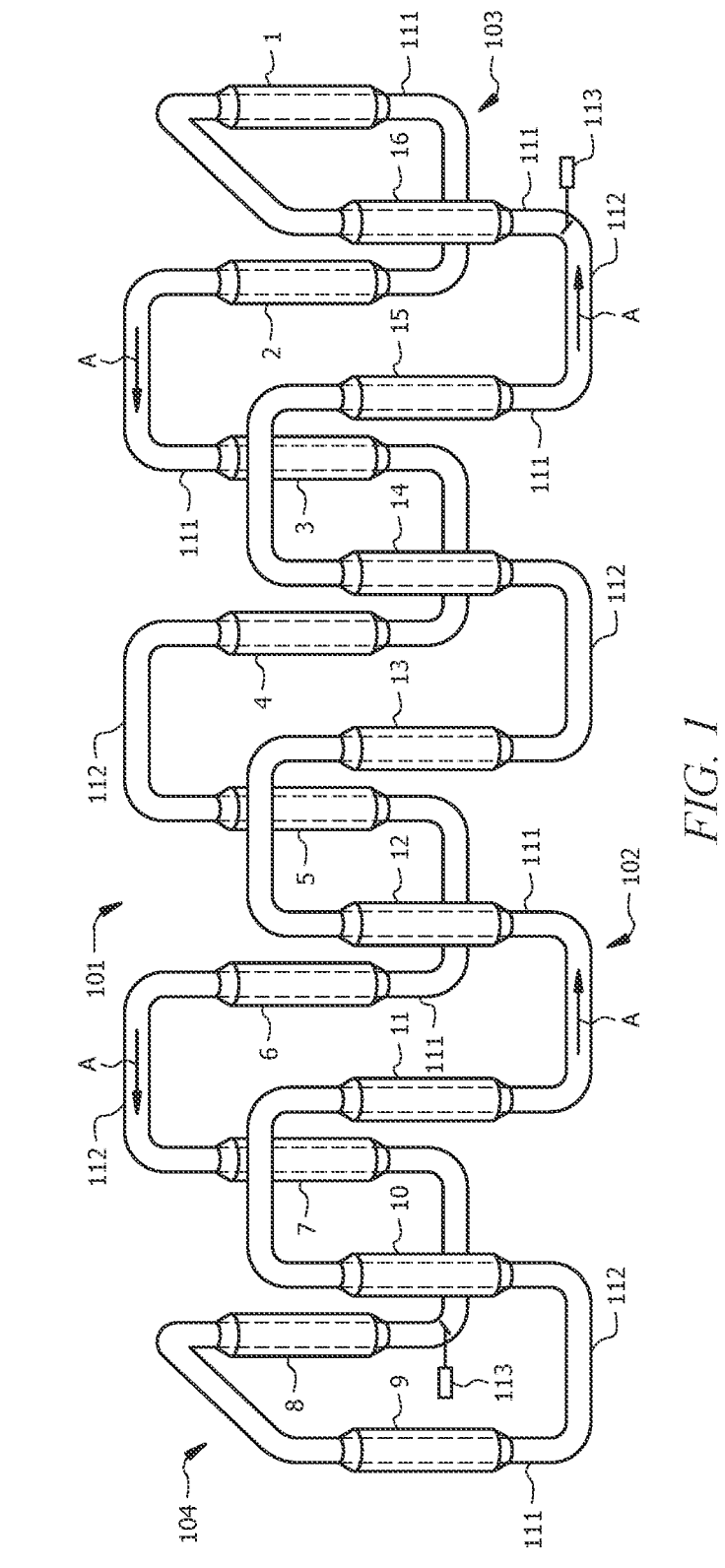
FIG. 1 illustrates a perspective view of a loop slurry reactor.
Figure 4:
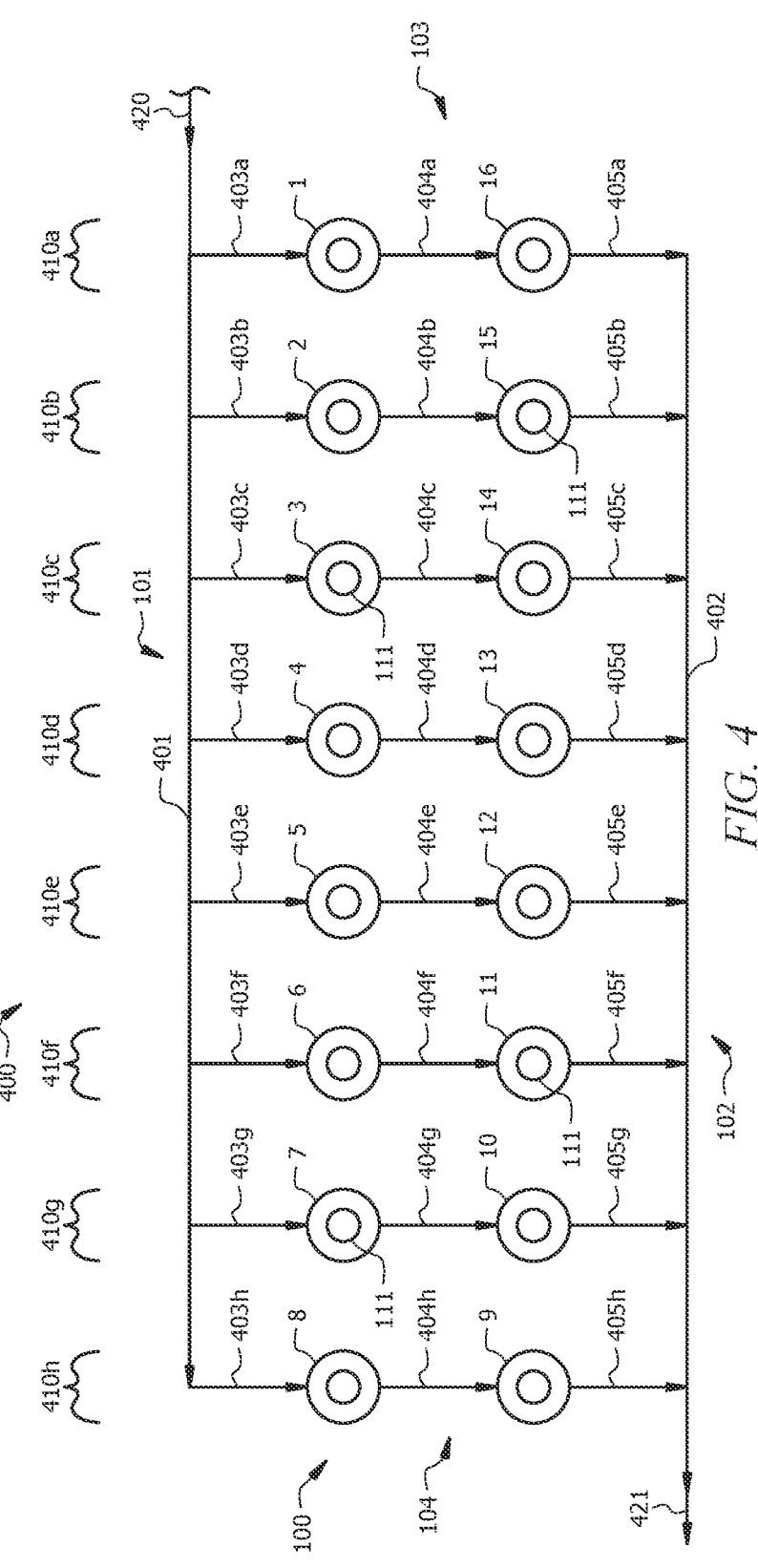

FIG. 4 illustrates a top view of the vertical legs of the loop slurry reactor of FIG. 1, with cooling jackets placed around each of the vertical legs, and having a process flow diagram of a coolant distribution system according to the disclosure.

Figure 5:
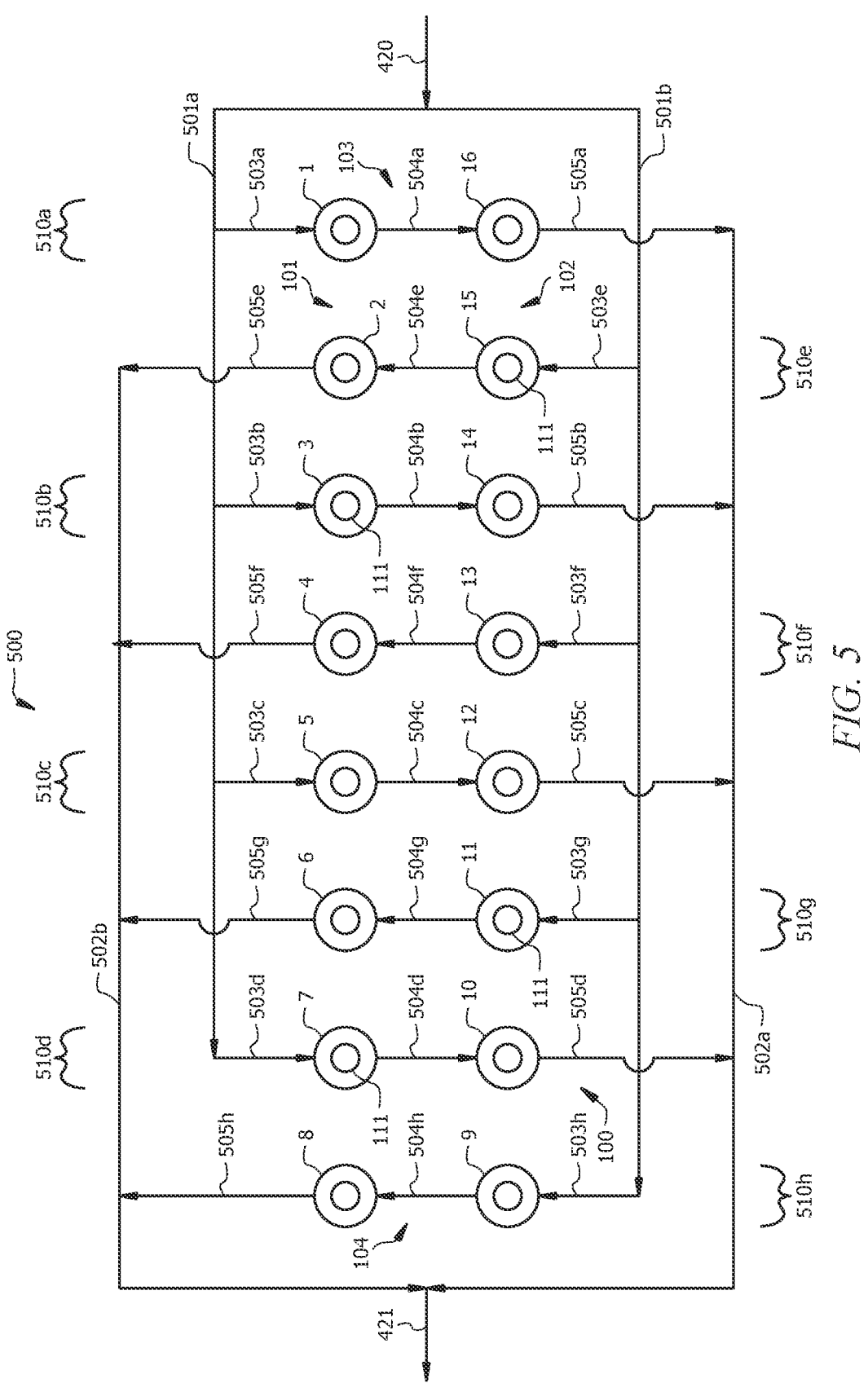

FIG. 5 illustrates a top view of the vertical legs of the loop slurry reactor of FIG. 1, with cooling jackets placed around each of the vertical legs, and having a process flow diagram of another coolant distribution system according to the disclosure.

Figure 6:
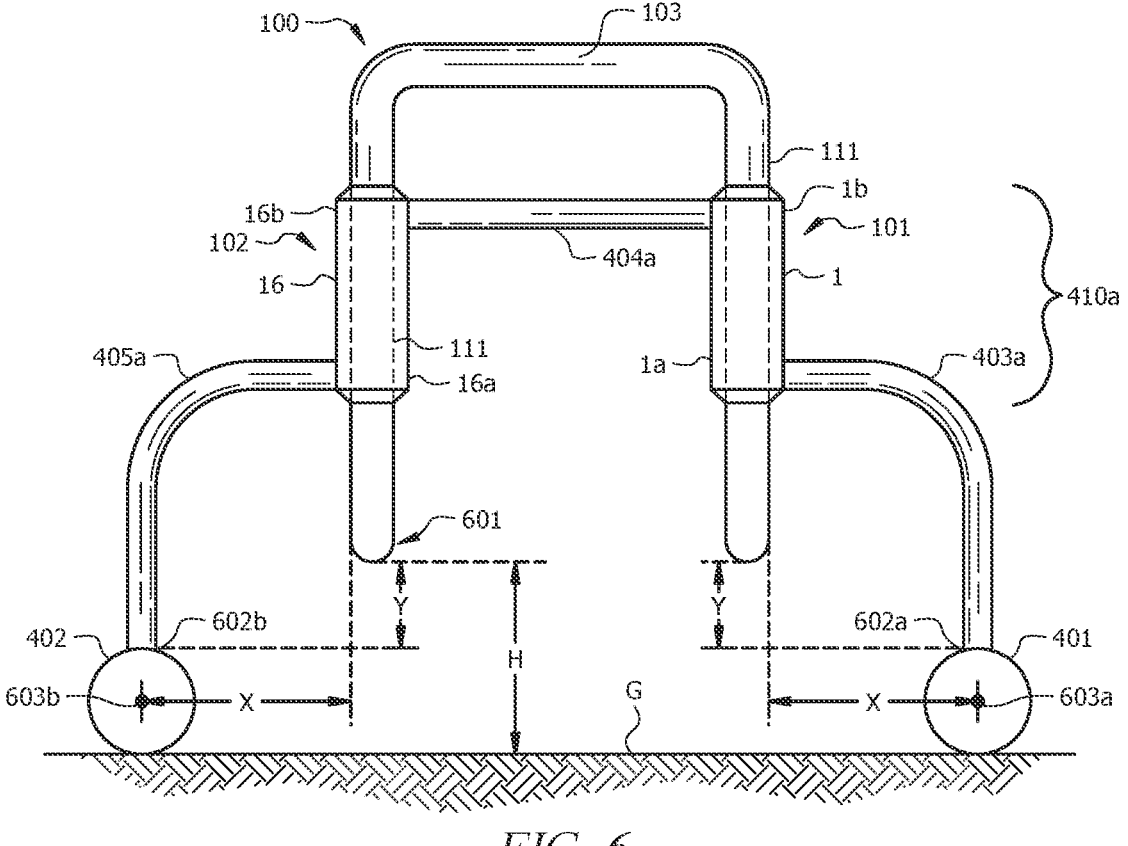

FIG. 6 illustrates a side view of the coolant distribution system of FIG. 4, viewed from the third side of the loop slurry reactor.

Figure 7:
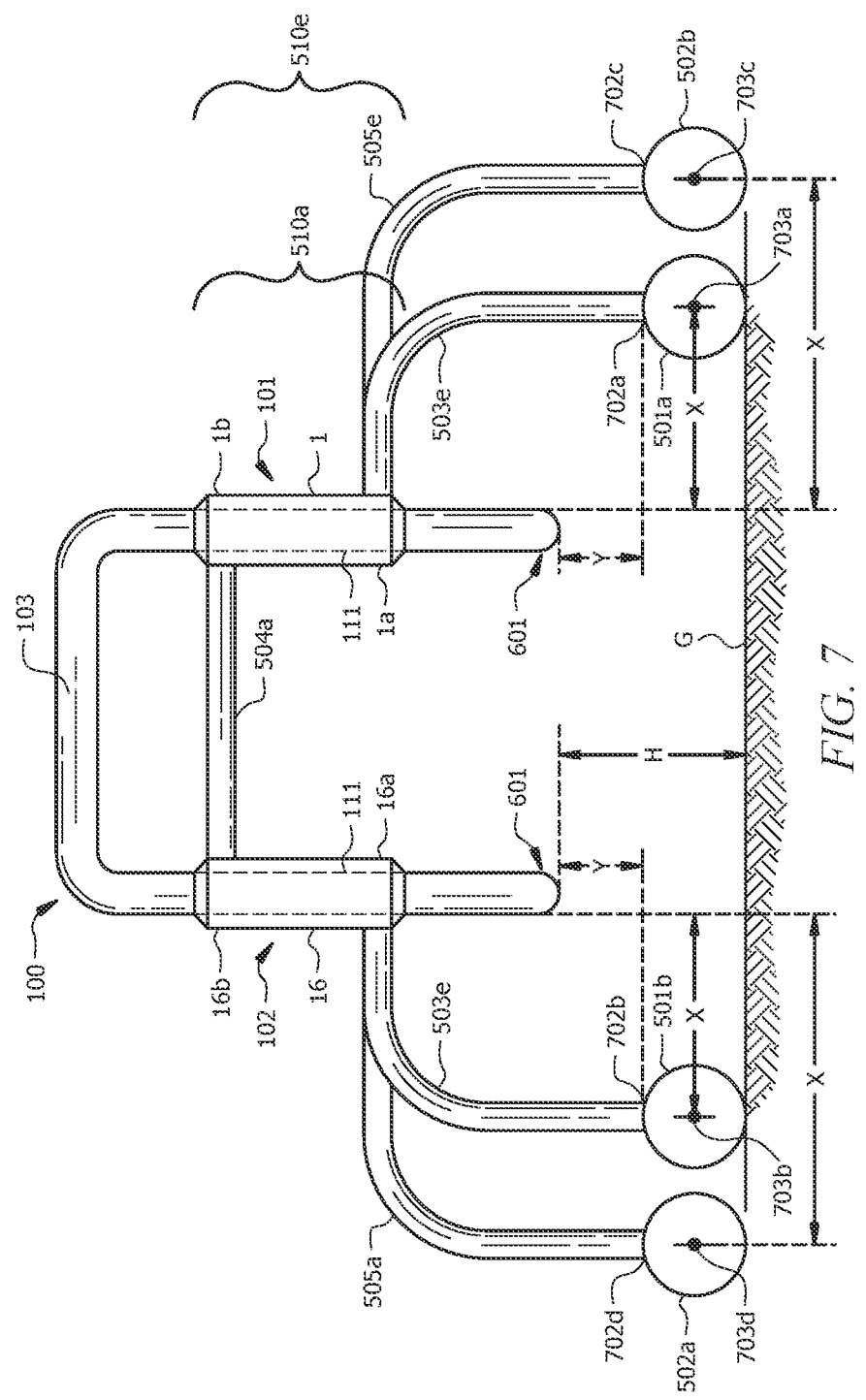

FIG. 7 illustrates a side view of the coolant distribution system of FIG. 5, viewed from the third side of the loop slurry reactor.

Figure 8:
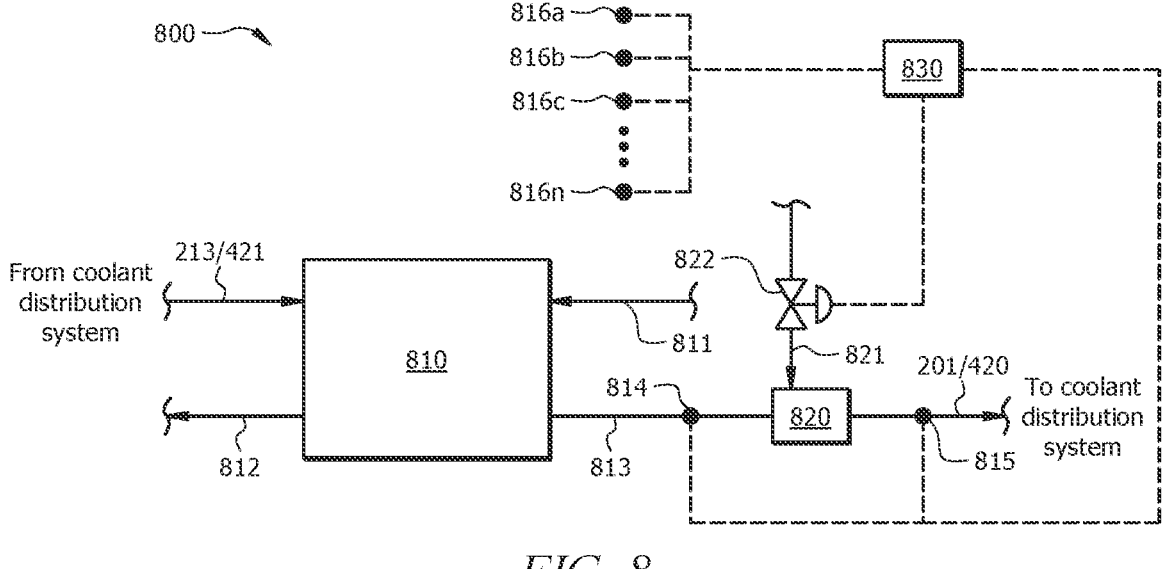

FIG. 8 illustrates a process flow diagram of a coolant temperature control system according to the disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The figures described above and the written description of specific structures and functions below are not presented to limit the scope of what Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

The terms "configured to", "configured for use", "adapted for use", and similar language is used herein to reflect that the particular recited structure or procedure is used in the disclosed system or process. For example, unless otherwise specified, a particular structure "configured for use" means it is "configured for use in an olefin polymerization reactor cooling system" and therefore is designed, shaped, arranged, constructed, and/or tailored to cool an olefin polymerization reactor, as would have been understood by the skilled person.

The terms "conduit" and "line" are interchangeable, and as used herein, refer to a physical structure such as pipe or tubing configured for the flow of materials therethrough. The materials that flow in the "conduit" or "line can be in the gas phase, the liquid phase, the solid phase, or a combination of these phases.

The term "stream" as used herein refers to a physical composition of materials that flow through a "conduit" or "line".

The term "header" as used herein refers to a pipe or conduit that has an inlet connected to a coolant supply line and at least two outlets for coolant to flow to conduits that are connected to the outlets of the header.

The term "sub-header" as used herein refers to a pipe or conduit that has an inlet and at least two outlets for coolant to flow to conduits that are connected to the outlets of the sub-header, where the inlet of the sub-header is connected to a coolant supply line only indirectly via a header.

Disclosed herein are processes and systems for coolant distribution and for coolant temperature control in olefin polymerization. The processes and systems for coolant distribution involve the delivery of coolant to cooling jackets of a loop slurry reactor, and receipt of warmed coolant from the cooling jackets. The processes and systems for coolant distribution have unique configurations of piping/conduits that have an unexpectedly low length of piping/conduit and an unexpectedly reduced pressure drop across the coolant distribution system. The process and system for coolant temperature control simplifies the control regime for controlling temperature of coolant for return to a coolant distribution system. The coolant temperature control techniques disclosed herein can be used for reactor startup and for steady-state reactor operation.

Turning now to the figures, FIG. 1 illustrates a perspective view of a loop slurry reactor 100. The loop slurry reactor 100 generally has vertical legs 111, which can be also referred to as vertical segments. The loop slurry reactor 100 also has bends 112, which are also referred to as upper and lower horizontal segments, fluidly connecting the vertical legs 111 to one another such that a flowpath in a reaction loop is formed in the direction of arrows A (e.g., counter-clockwise for the loop slurry reactor 100 shown in FIG. 1). Each of the vertical legs 111 is parallel to and coupled to an adjacent vertical leg 111 by one of the bends 112. Polymerization of one or more olefins occurs in the reaction zone that is defined by the reaction loop. One or more pumps 113 can be coupled with the flowpath in the loop slurry reactor 100 and configured (e.g., via motor/impeller arrangement) to circulate the slurry in the flowpath loop. The pumps or circulators can be axial, radial, or mixed flow. In aspects, the loop slurry reactor 100 can have a volume in a range of about 151 m³ to about 379 m³ (40,000 gallons to 100,000 gallons); alternatively, in a range of about 189 m³ to about 360 m³ (50,000 gallons to 95,000 gallons); alternatively, in a range of about 227 m³ to about 341 m³ (60,000 gallons to 90,000 gallons); alternatively, about 341 m³ (90,000 gallons).

In aspects, each vertical leg 111 may include a cooling jacket. FIG. 1 illustrates cooling jackets 1 to 16 on each of the sixteen vertical legs 111. Each cooling jacket 1 to 16 may generally wrap around an outer surface of its respective vertical leg 111. Coolant flows through each cooling jacket 1 to 16 and absorbs the heat generated in the loop slurry reactor 100 by contacting the outer surface of the respective leg 111 to which the cooling jacket 1 to 16 is attached. In each cooling jacket 1 to 16, the flowing coolant warms due to the heat received from the respective leg 111 and flows from the respective cooling jacket 1 to 16 to a coolant cooling system, such as an embodiment of a coolant cooling system as disclosed herein. In aspects of the disclosure in which coolant is used as a heating medium to heat the reactor contents, such as during reactor startup, the flowing coolant cools in the cooling jackets 1 to 16 due to the heat transferred to the respective leg 111 and flows from the respective cooling jacket 1 to 16 to the coolant cooling system operating in heating mode for reactor startup, such as an embodiment of a coolant cooling system as disclosed herein The loop slurry reactor 100 depicted in FIG. 1 has sixteen vertical legs 111, and thus is a size for which previously used techniques for reactor cooling have large pipes and result in overly complex piping configurations and cooling configurations for the coolant circuit. While the loop slurry reactor 100 in FIG. 1 includes sixteen vertical legs 111, it is contemplated that the loop slurry reactor 100 may include more or fewer vertical legs 111 and associated bends 112 than are shown in FIG. 1. Generally, the number of legs 111 equals the number of bends 112 in the loop slurry reactor 100. The legs 111 are generally of a linear tube shape. The bends 112 may be of any shape or form that connects to two of the vertical legs 111 and allows a reaction mixture to flow from a first leg of the two vertical legs 111, through the bend 112, and into the second leg of the two vertical legs 111. For example, in some configurations, the bends 112 may have a continuous curvature (e.g., have a curved U-shape) rather than a square U-shape as is shown in FIG. 1; alternatively, the bends 112 may have a square U-shape as shown in FIG. 1; alternatively, some of the bends 112 may have a continuous curvature while others of the bends 112 may have a square U-shape.

In aspects, the inside diameter of the loop slurry reactor 100 can be in a range of from about 0.3048 m to about 0.914 m (12 in to 36 in). In additional aspects, the outside diameter of the loop slurry reactor 100 can be in a range of from about 0.3048 m to about 0.914 m (12 in to 36 in). The loop slurry reactor 100 can have an inner diameter that is the same for the entire loop; alternatively, a first portion (e.g., one or more portions near a discharge line) can have an inner diameter than is larger than a second portion of the loop reactor 100, with both portions having inner diameters in a range of from about 0.3048 m to about 0.914 m (12 in to 36 in).

The configurations of coolant distribution systems and processes disclosed herein will be made with reference to the sides and ends of the loop slurry reactor 100. The loop slurry reactor 100 has a first side 101, a second side 102, a third side 103, and a fourth side 104. The first side 101 is parallel to the second side 102, the third side 103 is parallel to the fourth side 104, and the sides 101 and 102 are angled (e.g., in a range from about 45°-135°) with respect to the sides 103 and 104. The physical structure of the loop formed by the vertical legs 111 and bends 112, from a top view of the loop slurry reactor 100, is a rectangular oval. The shape of the loop from top view can also be rectangular or square.

In practical use, the vertical legs 111 and bends 112 of the loop slurry reactor 100 can be affixed to scaffolding or some other framed structure so that the bottom of the loop slurry reactor 100 is from about 1 ft to about 10 ft (about 0.3048 m to about 3.048 m) above the ground.

Figure 2:
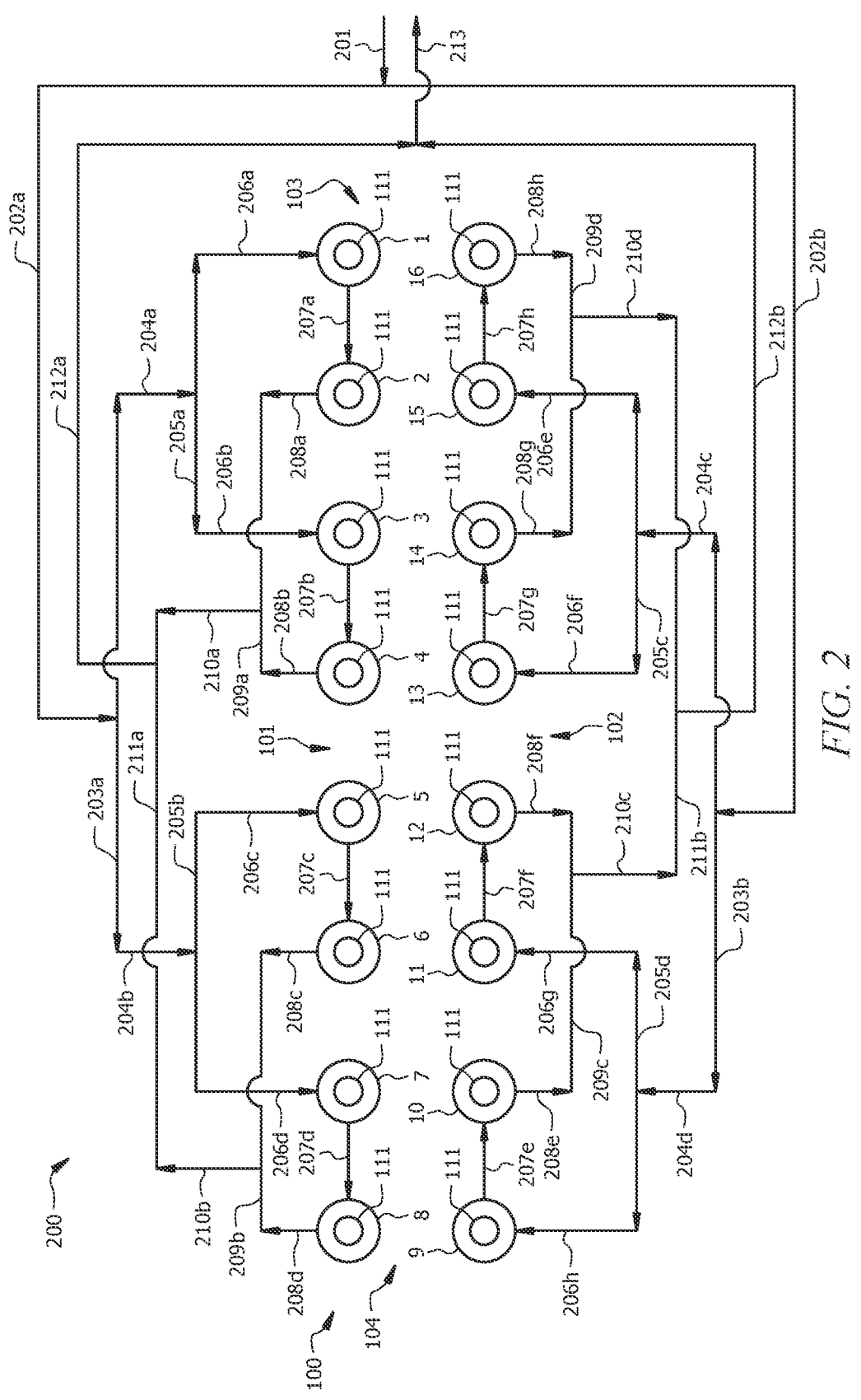
FIG. 2 illustrates a top view of the vertical legs of the loop slurry reactor of FIG. 1, with cooling jackets placed around each of the vertical legs, and having a process flow diagram of a coolant distribution system similar to the configuration previously used for smaller loop slurry reactors.

FIG. 2 illustrates a top view of the vertical legs 111 of the loop slurry reactor 100 of FIG. 1, with cooling jackets 1 to 16 placed around each of the vertical legs 111, and having a coolant distribution system 200 similar to the configuration previously used for smaller loop slurry reactors. The bends 112 of the loop slurry reactor 100 are not shown in FIG. 2 for clarity of describing the coolant distribution system 200.

As can be seen, when loop slurry reactors are designed for large global scale production, the coolant distribution system 200 is quite complex. The coolant distribution system 200 is set up so that the flow of coolant through a cooling jacket 1 to 16 is counter-current to the flow of reaction mixture in the respective vertical leg 111. Thus, coolant is supplied to every-other cooling jacket 1, 3, 5, and 7 on the first side 101 of the loop slurry reactor 100 and every-other cooling jacket 9, 11, 13, and 15 on the second side 102 of the loop slurry reactor 100.

The coolant distribution system 200 of FIG. 2 has a coolant supply line 201 and coolant return line 213 on the third side 103 of the loop slurry reactor 100. That is, the coolant is supplied to, and withdrawn from, the same third side 103 of the loop slurry reactor 100.

The coolant supply line 201 splits into a first side coolant supply line 202a and a second side coolant supply line 202b. The first side coolant supply line 202a extends along the first side 101 of the loop slurry reactor 100, while the second side coolant supply line 202b extends along the second side 102 of the loop slurry reactor 100.

The first side coolant supply line 202a connects to a first coolant supply header 203a. The first coolant supply header 203a is connected to conduit 204a and conduit 204b. Conduit 204a is also connected to a first coolant supply sub-header 205a, and conduit 204b is also connected to a second coolant supply sub-header 205b. The first coolant supply sub-header 205a is connected to conduit 206a and to conduit 206b. The second coolant supply sub-header 205b is connected to a conduit 206c and a conduit 206d. Conduit 206a connects to the cooling jacket 1, conduit 206b connects to the cooling jacket 3, conduit 206c connects to the cooling jacket 5, and conduit 206d connects to the cooling jacket 7.

The second side coolant supply line 202b connects to a second coolant supply header 203b. The second coolant supply header 203b is connected to conduit 204c and conduit 204d. Conduit 204c is also connected to a third coolant supply sub-header 205c, and conduit 204d is also connected to a fourth coolant supply sub-header 205d. The third coolant supply sub-header 205c is connected to conduit 206e and to conduit 206f. The fourth coolant supply sub-header 205d is connected to a conduit 206g and a conduit 206h. Conduit 206e connects to the cooling jacket 15, conduit 206f connects to the cooling jacket 13, conduit 206g connects to the cooling jacket 11, and conduit 206h connects to the cooling jacket 9.

For the cooling jackets 1, 3, 5, and 7 on the first side 101 of the loop slurry reactor 100, the following flow regime for coolant supply is performed: coolant flows to cooling jacket 1 from coolant supply line 201, first side coolant supply line 202a, first coolant supply header 203a, conduit 204a, first coolant supply sub-header 205a, and conduit 206a; coolant flows to cooling jacket 3 from coolant supply line 201, first side coolant supply line 202a, first coolant supply header 203a, conduit 204a, first coolant supply sub-header 205a, and conduit 206b; coolant flows to cooling jacket 5 from coolant supply line 201, first side coolant supply line 202a, first coolant supply header 203a, conduit 204b, second coolant supply sub-header 205b, and conduit 206c; coolant flows to cooling jacket 7 from coolant supply line 201, first side coolant supply line 202a, first coolant supply header 203a, conduit 204b, second coolant supply sub-header 205b, and conduit 206d.

For the cooling jackets 9, 11, 13, and 15 on the second side 102 of the loop slurry reactor 100, the following flow regime for coolant supply is performed: coolant flows to cooling jacket 9 from coolant supply line 201, second side coolant supply line 202b, second coolant supply header 203b, conduit 204d, third coolant supply sub-header 205d, and conduit 206h; coolant flows to cooling jacket 11 from coolant supply line 201, second side coolant supply line 202b, second coolant supply header 203b, conduit 204d, third coolant supply sub-header 205d, and conduit 206g; coolant flows to cooling jacket 13 from coolant supply line 201, second side coolant supply line 202b, second coolant supply header 203b, conduit 204c, fourth coolant supply sub-header 205c, and conduit 206f; coolant flows to cooling jacket 15 from coolant supply line 201, second side coolant supply line 202d, second coolant supply header 203b, conduit 204c, fourth coolant supply sub-header 205c, and conduit 206e.

The coolant distribution system 200 utilizes pairs of cooling jackets for supply and return of coolant. For the loop slurry reactor 100 in FIG. 2, the cooling jackets 1 to 16 can be divided into eight pairs. Each of the cooling jackets in each pair is only on the first side 101 or on the second side 102 of the loop slurry reactor 100. In FIG. 2, pairs of cooling jackets include cooling jackets 1 and 2, cooling jackets 3 and 4, cooling jackets 5 and 6, cooling jackets 7 and 8, cooling jackets 9 and 10, cooling jackets 11 and 12, cooling jackets 13 and 14, and cooling jackets 15 and 16. Cooling jacket pairs 1/2, 3/4, 5/6, and 7/8 are all on the first side 101 of the loop slurry reactor 100. Cooling jacket pairs 9/10, 11/12, 13/14, and 15/16 are all on the second side 102 of the loop slurry reactor 100. Intermediate conduit 207a connects cooling jacket 1 to cooling jacket 2. Intermediate conduit 207b connects cooling jacket 3 to cooling jacket 4. Intermediate conduit 207c connects cooling jacket 5 to cooling jacket 6. Intermediate conduit 207d connects cooling jacket 7 to cooling jacket 8. Intermediate conduit 207e connects cooling jacket 9 to cooling jacket 10. Intermediate conduit 207f connects cooling jacket 11 to cooling jacket 12. Intermediate conduit 207g connects cooling jacket 13 to cooling jacket 14. Intermediate conduit 207h connects cooling jacket 15 to cooling jacket 16. All intermediate conduits 207a-d are on the first side 101 of the loop slurry reactor 100, and all intermediate conduits 207e-h are on the second side 102 of the loop slurry reactor 100. None of the intermediate conduits 207a-h cross the loop of the loop slurry reactor 100.

The warmed coolant flows from the cooling jackets 2, 4, 6, 8, 10, 12, 14, and 16 through conduits and headers having a configuration similar to the supply conduits and headers.

Conduit 208a connects to the cooling jacket 2 and to a first coolant return sub-header 209a. Conduit 208b connects to the cooling jacket 4 and to the first coolant return sub-header 209a. Conduit 208c connects to the cooling jacket 6 and to a second coolant return sub-header 209b. Conduit 208d connects to the cooling jacket 8 and to the second coolant return sub-header 209b. The first coolant return sub-header 209a and the second coolant return sub-header 209b both connect to a first coolant return header 211a via conduits 210a and 210b, respectively. The first coolant return header 211a connects to the first side coolant return line 212a.

Conduit 208e connects to the cooling jacket 10 and to a third coolant return sub-header 209c. Conduit 208f connects to the cooling jacket 12 and to the third coolant return sub-header 209c. Conduit 208g connects to the cooling jacket 14 and to a fourth coolant return sub-header 209d. Conduit 208h connects to the cooling jacket 16 and to the fourth coolant return sub-header 209d. The third coolant return sub-header 209c and the fourth coolant return sub-header 209d both connect to a second coolant return header 211b via conduits 210c and 210d, respectively. The second coolant return header 211b connects to the second side coolant return line 212b The first side coolant return line 212a combines with the second side coolant return line 212b to form the coolant return line 213 proximate the third side 103 of the loop slurry reactor 100.

For the cooling jackets 1, 3, 5, and 7 on the first side 101 of the loop slurry reactor 100, the following flow regime for coolant return is performed: warmed coolant flows from cooling jacket 2 to conduit 208a, to the first coolant return sub-header 209a, to conduit 210a, to the first coolant return header 211a, to first side coolant return line 212a, to coolant return line 213; warmed coolant flows from the cooling jacket 4 to conduit 208b, to the first coolant return sub-header 209a, to conduit 210a, to the first coolant return header 211a, to the first side coolant return line 212a, to coolant return line 213; warmed coolant flows from cooling jacket 6 to conduit 208c, to the second coolant return sub-header 209b, to conduit 210b, to the first coolant return header 211a, to first side coolant return line 212a, to coolant return line 213; and warmed coolant flows from the cooling jacket 8 to conduit 208d, to the second coolant return sub-header 209b, to conduit 210b, to the first coolant return header 211a, to the first side coolant return line 212a, to coolant return line 213.

For the cooling jackets 9, 11, 13, and 15 on the second side 102 of the loop slurry reactor 100, the following flow regime for coolant return is performed: warmed coolant flows from cooling jacket 10 to conduit 208e, to the third coolant return sub-header 209c, to conduit 210c, to the second coolant return header 211b, to the second side coolant return line 212b, to coolant return line 213; warmed coolant flows from the cooling jacket 12 to conduit 208f, to the third coolant return sub-header 209c, to conduit 210c, to the second coolant return header 211b, to the second side coolant return line 212b, to coolant return line 213; warmed coolant flows from cooling jacket 14 to conduit 208g, to the fourth coolant return sub-header 209d, to conduit 210d, to the second coolant return header 211b, to the second side coolant return line 212b, to coolant return line 213; and warmed coolant flows from the cooling jacket 16 to conduit 208h, to the fourth coolant return sub-header 209d, to conduit 210d, to the second coolant return header 211b, to the second side coolant return line 212b, to coolant return line 213.

As can be seen in FIG. 2, the coolant distribution system 200 is complex with tiered levels of headers (headers 203a-b and 211a-b, sub-headers 205a-d and 209a-d) on each of the first side 101 and the second side 102 of the loop slurry reactor 100, for both coolant supply and coolant return. The volume of coolant needed to circulate through all the headers and conduits is very large due to the length of pipe needed in order to build the tiered header configuration.

Figure 3:
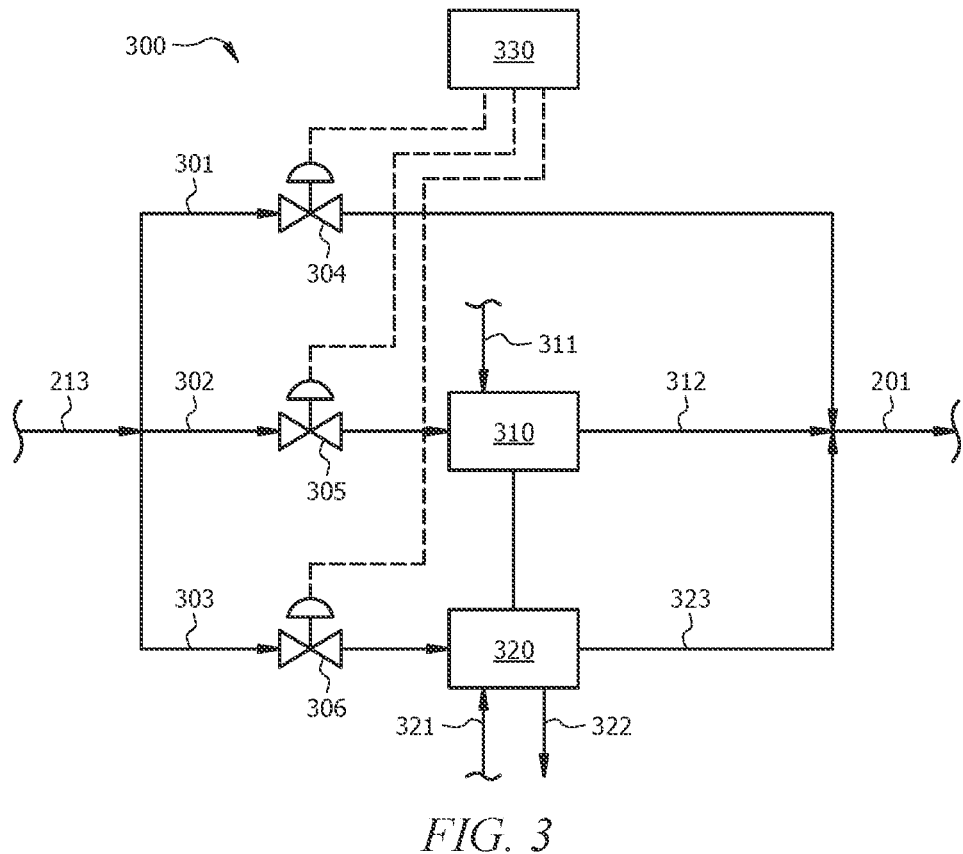
FIG. 3 illustrates a process flow diagram of a temperature control system for the coolant that is similar to the configuration previously used for smaller loop slurry reactors.

FIG. 3 illustrates a process flow diagram of a temperature control system 300 for the coolant that is similar to the configuration previously used for smaller loop slurry reactors. Warmed coolant from a loop slurry reactor, such as warmed coolant in coolant return line 213 of FIG. 2 flows into the temperature control system 300 and splits into three lines 301, 302, and 303. That is, coolant is split into three parallel flow paths. The valve 304 in line 301, the valve 305 in line 302, and the valve 306 in line 303 control the flow of coolant through the respective line and flow path. Actuation of each of the valves 304, 305, and 306 is controlled by a controller 330 that monitors the temperature of the reaction mixture in the loop slurry reactor 100 (e.g., via thermocouples strategically placed in the loop slurry reactor 100, in coolant distribution system 200, in the temperature control system 300, or combinations thereof). The coolant in line 301 experiences no heating or cooling except for any heat exchange that might occur with ambient conditions at the plant, the coolant in line 302 enters a steam injection heater 310 for heating with steam from line 311, and the coolant in line 303 enters a heat exchanger 320 for cooling with cooling medium that flows into the heat exchanger 320 via line 321 and flows from the heat exchanger in line 322. Thus, the temperature control system 300 simultaneously passes coolant through line 301, a steam injection heater 310, and a heat exchanger 320; and the three valves 304, 305, and 306 are controlled in tandem, for controlling the temperature of the coolant such that the bypass coolant in line 301 combines with heated coolant in line 312 and cooled coolant in line 323 to form the coolant supply line 201 that can flow to a loop slurry reactor, such as reactor 100.

In the temperature control system 300 of FIG. 3, about 15 to 20 vol % of the coolant flows through the constant flow line 301, in order to maintain a constant flow of coolant to the reactor and provide a continuous pressure drop in the coolant circuit that is formed by flow of coolant from the coolant supply line 201, through the coolant distribution system for the loop slurry reactor 100 (e.g., coolant distribution system 200), and back to the coolant return line 213. The remaining 85 to 95 vol % of coolant is split between lines 302 and 303 according to control of valves 305 and 306. If coolant is determined to have a temperature lower than a threshold value or lower than the lower end point of an operating range (e.g., too much cooling for the reactor 100), a greater portion of the remaining coolant can flow through steam injection heater 310 than through heat exchanger 320; whereas, if coolant is determined to have a temperature greater than a threshold value or greater than the upper end point of a threshold range (e.g., not enough cooling for the reactor 100), a greater portion of the remaining coolant can flow through heat exchanger 320 than through the steam injection heater 310.

The use of three parallel flow paths can make temperature control of the coolant complex, especially at times of reactor startup, shutdown, or upset.

FIGS. 4-5 illustrate coolant distribution systems 400 and 500 that simplify the coolant distribution configuration for loop slurry reactors. FIGS. 6-7 illustrated side views of the coolant distribution systems 400 and 500, respectively. FIG. 8 illustrates a temperature control system 800 that simplifies coolant temperature control for loop slurry reactors. It is believed that the disclosed coolant distribution systems 400 and 500 as well as the coolant temperature control system 800 are suitable for use with large scale loop slurry reactors, as well as providing similar advantages for smaller-scale loop slurry reactors.

FIG. 4 illustrates a top view of the vertical legs 111 of the loop slurry reactor 100 of FIG. 1, with cooling jackets 1 to 16 placed around each of the vertical legs 111, and having a coolant distribution system 400 according to the disclosure. The bends 112 of the loop slurry reactor 100 are not shown in FIG. 2 for clarity of describing the coolant distribution system 400.

Coolant distribution system 400 can include a coolant supply header 401 extending along the first side 101 of the loop slurry reactor 100, a coolant return header 402 extending along the second side 102 of the loop slurry reactor 100, and coolant passes 410*a-h*, wherein each of the coolant passes 410*a-h* is configured to i) exchange heat with a pair of cooling jackets of the vertical legs 111, ii) receive coolant from the coolant supply header 401 on the first side 101 of the loop slurry reactor 100, and iii) return coolant to the coolant return header 402 on the second side 102 of the loop slurry reactor 100.

Unlike the pairs of cooling jackets in the coolant distribution system 200 of FIG. 2, the pairs of cooling jackets in coolant distribution system 400 each have a cooling jacket on the first side 101 of the loop slurry reactor 100 and another cooling jacket on the second side 102 of the loop slurry reactor 100. The pairs of cooling jackets in coolant distribution system 400 are 1/16, 2/15, 3/14, 4/13, 5/12, 6/11, 7/10, and 8/9.

Coolant distribution system 400 utilizes either counter-current flow or co-current flow of coolant in each of the cooling jackets 1 to 16, with respect to the flow of reaction mixture in the vertical legs 111. Coolant flow is counter-current with respect to the flow of reaction mixture in the respective vertical legs 111 in coolant jackets 1, 3, 5, 7, 9, 11, 13, and 15; while, coolant flow is co-current with respect to the flow of reaction mixture in the respective vertical legs 111 in coolant jackets 2, 4, 6, 8, 10, 12, 14, and 16. When allowing such a design that utilizes both counter-current and co-current coolant flow, the coolant distribution system 400 can have a single coolant header 401 on side 101 of the loop slurry reactor 100, a single coolant return header 402 on side 102 of the loop slurry reactor 100, and uses no sub-headers.

Each coolant pass 410*a-h* includes an inlet conduit connected to the coolant supply header 401, a first cooling jacket wrapped around at least a portion of one of the vertical legs 111 and connected to the inlet conduit, a middle conduit connected to the first cooling jacket, a second cooling jacket wrapped around at least a portion of another of the vertical legs 111 and connected to the middle conduit, and an outlet conduit connected to the second cooling jacket and to the coolant return header 402. The direction of flow of coolant in each coolant pass 410*a-h* is from the first side 101 of the loop slurry reactor 100 to the second side 102 of the loop slurry reactor 100.

For coolant pass 410*a*, inlet conduit 403*a* is connected to the coolant supply header 401 and to first cooling jacket 1, middle conduit 404*a* is connected to the first cooling jacket 1, second cooling jacket 16 is connected to the middle conduit 404*a*, and outlet conduit 405*a* is connected to the second cooling jacket 16 and to the coolant return header 402.

For coolant pass 410*b*, inlet conduit 403*b* is connected to the coolant supply header 401 and to cooling jacket 2, middle conduit 404*b* is connected to the first cooling jacket 2, second cooling jacket 15 is connected to the middle conduit 404*b*, and outlet conduit 405*b* is connected to the second cooling jacket 15 and to the coolant return header 402.

For coolant pass 410*c*, inlet conduit 403*c* is connected to the coolant supply header 401 and to cooling jacket 3, middle conduit 404*c* is connected to the first cooling jacket 3, second cooling jacket 14 is connected to the middle conduit 404*c*, and outlet conduit 405*c* is connected to the second cooling jacket 14 and to the coolant return header 402.

For coolant pass 410d, inlet conduit 403d is connected to the coolant supply header 401 and to cooling jacket 4, middle conduit 404d is connected to the first cooling jacket 4, second cooling jacket 13 is connected to the middle conduit 404d, and outlet conduit 405d is connected to the second cooling jacket 13 and to the coolant return header 402.

For coolant pass 410e, inlet conduit 403e is connected to the coolant supply header 401 and to cooling jacket 5, middle conduit 404e is connected to the first cooling jacket 5, second cooling jacket 12 is connected to the middle conduit 404e, and outlet conduit 405e is connected to the second cooling jacket 12 and to the coolant return header 402.

For coolant pass 410f, inlet conduit 403f is connected to the coolant supply header 401 and to cooling jacket 6, middle conduit 404f is connected to the first cooling jacket 6, second cooling jacket 11 is connected to the middle conduit 404f, and outlet conduit 405f is connected to the second cooling jacket 11 and to the coolant return header 402.

For coolant pass 410g, inlet conduit 403g is connected to the coolant supply header 401 and to cooling jacket 7, middle conduit 404g is connected to the first cooling jacket 7, second cooling jacket 10 is connected to the middle conduit 404g, and outlet conduit 405g is connected to the second cooling jacket 10 and to the coolant return header 402.

For coolant pass 410h, inlet conduit 403h is connected to the coolant supply header 401 and to cooling jacket 8, middle conduit 404h is connected to the first cooling jacket 8, second cooling jacket 9 is connected to the middle conduit 404h, and outlet conduit 405h is connected to the second cooling jacket 9 and to the coolant return header 402.

In aspects, a diameter of the inlet conduit 403a-h, a diameter of the middle conduit 404a-h, and a diameter of the outlet conduit 405a-h in each coolant pass 410a-h are about equal in value. In some aspects, all inlet conduits 403a-h, middle conduits 404a-h, and outlet conduits 405a-h have the same diameter.

In aspects, the inlet conduit 403a-h and the outlet conduit 405a-h of each coolant pass 410a-h are parallel with one another.

In aspects, a longitudinal axis of the inlet conduit 403a-h of each coolant pass 410a-h extends at an angle in the range of 1°-179° with respect to a longitudinal axis of the first coolant supply header 401; additionally or alternatively, a longitudinal axis of the outlet conduit 405a-h of each coolant pass 410a-h extends at an angle in the range of 1°-179° with respect to a longitudinal axis of the first coolant return header 402.

The coolant supply line 420 is connected to the coolant supply header 401. The coolant supply header 401 is the only supply header in the coolant distribution system 400. The coolant return header 402 is connected to the coolant return line 421. The coolant return header 402 is the only return header in the coolant distribution system 400. The coolant supply line 420 connects with the coolant supply header 401 proximate the third side 103 of the loop slurry reactor 100, while the coolant return line 421 connects with the coolant return header 402 proximate the fourth side 104 of the loop slurry reactor 100. Connecting lines 420 and 421 to the headers 401 and 402 on opposite sides 103 and 104 of the loop slurry reactor 100 is contrasted with the coolant distribution system 200 of FIG. 2, where the coolant supply line 201 and coolant return line 213 connect to piping only on the third side 103 of the loop slurry reactor 100.

FIG. 5 illustrates a top view of the vertical legs 111 of the loop slurry reactor 100 of FIG. 1, with cooling jackets 1 to 16 placed around each of the vertical legs 111, and having a coolant distribution system 500 according to the disclosure. The bends 112 of the loop slurry reactor 100 are not shown in FIG. 5 for clarity of describing the coolant distribution system 500.

Coolant distribution system 500 can include a first coolant supply header 501a extending along the first side 101 of the loop slurry reactor 100, a second coolant supply header 501b extending along the second side 102 of the loop slurry reactor 100, a first coolant return header 502a extending along the second side 102 of the loop slurry reactor 100, a second coolant return header 502b extending along the first side 101 of the loop slurry reactor 100, first coolant passes 510a-d, and second coolant passes 510e-h. Each of the first coolant passes 510a-d is configured to i) exchange heat with a pair of cooling jackets of the vertical legs 111, ii) receive coolant from the first coolant supply header 501a on the first side 101 of the loop slurry reactor 100, and iii) return coolant to the first coolant return header 502a on the second side 102 of the loop slurry reactor 100. Each of the second coolant passes 510e-h is configured to i) exchange heat with a pair of cooling jackets of the vertical legs 111, ii) receive coolant from the second coolant supply header 501b on the second side 102 of the loop slurry reactor 100, and iii) return coolant to the second coolant return header 502b on the first side 101 of the loop slurry reactor 100.

Unlike the pairs of cooling jackets in the coolant distribution system 200 of FIG. 2, the pairs of cooling jackets in coolant distribution system 500 each have a cooling jacket on the first side 101 of the loop slurry reactor 100 and another cooling jacket on the second side 102 of the loop slurry reactor 100. The pairs of cooling jackets in coolant distribution system 500 are 1/16, 2/15, 3/14, 4/13, 5/12, 6/11, 7/10, and 8/9.

In contrast to the coolant distribution system 400 in FIG. 4 where coolant flows only from the first side 101 of the loop slurry reactor 100 to the second side 102 of the loop slurry reactor 100 in all coolant passes 410a-h, in the coolant distribution system 500 of FIG. 5, coolant flows from the first side 101 of the loop slurry reactor 100 to the second side 102 of the loop slurry reactor 100 in coolant passes 510a-d; and coolant flows from the second side 102 to the first side 101 of the loop slurry reactor 100 in coolant passes 510e-h. As such, the coolant distribution system 500 utilizes only counter-current flow of coolant in the cooling jackets 1 to 16, with respect to the flow of reaction mixture in the vertical legs 111. When utilizing only counter-current coolant flow, the coolant distribution system 500 can have two coolant supply headers 501a and 501b (only one supply header 501a on side 101 and only one supply header 501b on side 102 of the loop slurry reactor 100) and two coolant return headers 502a and 502b (only one return header 502a on side 102 and only one return header 502b on side 101 of the loop slurry reactor 100).

Each coolant pass 510a-d includes an inlet conduit connected to the first coolant supply header 501a, a first cooling jacket wrapped around at least a portion of one of the vertical legs 111 and connected to the inlet conduit, a middle conduit connected to the first cooling jacket, a second cooling jacket wrapped around at least a portion of another of the vertical legs 111 and connected to the middle conduit, and an outlet conduit connected to the second cooling jacket and to the first coolant return header 502a. The direction of flow of coolant in each coolant pass 510a-d is from the first side 101 of the loop slurry reactor 100 to the second side 102 of the loop slurry reactor 100.

Each coolant pass 510*e-h* includes an inlet conduit connected to the second coolant supply header 501*b*, a first cooling jacket wrapped around at least a portion of one of the vertical legs 111 and connected to the inlet conduit, a middle conduit connected to the first cooling jacket, a second cooling jacket wrapped around at least a portion of another of the vertical legs 111 and connected to the middle conduit, and an outlet conduit connected to the second cooling jacket and to the second coolant return header 502*b*. The direction of flow of coolant in each coolant pass 510*e-h* is from the second side 102 of the loop slurry reactor 100 to the first side 101 of the loop slurry reactor 100.

For coolant pass 510*a*, inlet conduit 503*a* is connected to the first coolant supply header 501*a* and to first cooling jacket 1, middle conduit 504*a* is connected to the first cooling jacket 1, second cooling jacket 16 is connected to the middle conduit 504*a*, and outlet conduit 505*a* is connected to the second cooling jacket 16 and to the first coolant return header 502*a*.

For coolant pass 510*b*, inlet conduit 503*b* is connected to the first coolant supply header 501*a* and to cooling jacket 3, middle conduit 504*b* is connected to the first cooling jacket 3, second cooling jacket 14 is connected to the middle conduit 504*b*, and outlet conduit 505*b* is connected to the second cooling jacket 14 and to the first coolant return header 502*a*.

For coolant pass 510*c*, inlet conduit 503*c* is connected to the first coolant supply header 501*a* and to cooling jacket 5, middle conduit 504*c* is connected to the first cooling jacket 5, second cooling jacket 12 is connected to the middle conduit 504*c*, and outlet conduit 505*c* is connected to the second cooling jacket 12 and to the first coolant return header 502*a*.

For coolant pass 510*d*, inlet conduit 503*d* is connected to the first coolant supply header 501*a* and to cooling jacket 7, middle conduit 504*d* is connected to the first cooling jacket 7, second cooling jacket 10 is connected to the middle conduit 504*d*, and outlet conduit 505*d* is connected to the second cooling jacket 10 and to the first coolant return header 502*a*.

For coolant pass 510*e*, inlet conduit 503*e* is connected to the second coolant supply header 501*b* and to cooling jacket 15, middle conduit 504*e* is connected to the first cooling jacket 15, second cooling jacket 2 is connected to the middle conduit 504*e*, and outlet conduit 505*e* is connected to the second cooling jacket 2 and to the second coolant return header 502*b*.

For coolant pass 510*f*, inlet conduit 503*f* is connected to the second coolant supply header 501*b* and to cooling jacket 13, middle conduit 504*f* is connected to the first cooling jacket 13, second cooling jacket 4 is connected to the middle conduit 504*f*, and outlet conduit 505*f* is connected to the second cooling jacket 4 and to the second coolant return header 502*b*.

For coolant pass 510*g*, inlet conduit 503*g* is connected to the second coolant supply header 501*b* and to cooling jacket 11, middle conduit 504*g* is connected to the first cooling jacket 11, second cooling jacket 6 is connected to the middle conduit 504*g*, and outlet conduit 505*g* is connected to the second cooling jacket 6 and to the second coolant return header 502*b*.

For coolant pass 510*h*, inlet conduit 503*h* is connected to the second coolant supply header 501*b* and to cooling jacket 9, middle conduit 504*h* is connected to the first cooling jacket 9, second cooling jacket 8 is connected to the middle conduit 504*h*, and outlet conduit 505*h* is connected to the second cooling jacket 8 and to the second coolant return header 502*b*.

In aspects, a diameter of the inlet conduit 503*a-h*, a diameter of the middle conduit 504*a-h*, and a diameter of the outlet conduit 505*a-h* in each coolant pass 510*a-h* are about equal in value. In some aspects, all inlet conduits 503*a-h*, middle conduits 504*a-h*, and outlet conduits 505*a-h* have the same diameter.

In aspects, the inlet conduit 503*a-h* and the outlet conduit 505*a-h* of each coolant pass 510*a-h* are parallel with one another.

In aspects, a longitudinal axis of the inlet conduit 503*a-d* of each coolant pass 510*a-d* extends at an angle in the range of 1°-179° with respect to a longitudinal axis of the first coolant supply header 501*a*; additionally or alternatively, a longitudinal axis of the inlet conduit 503*e-h* of each coolant pass 510*e-h* extends at an angle in the range of 1°-179° with respect to a longitudinal axis of the second coolant supply header 501*b*; additionally or alternatively, a longitudinal axis of the outlet conduit 505*a-d* of each coolant pass 510*a-d* extends at an angle in the range of 1°-179° with respect to a longitudinal axis of the first coolant return header 502*a*; additionally or alternatively, a longitudinal axis of the outlet conduit 505*e-h* of each coolant pass 510*e-h* extends at an angle in the range of 1°-179° with respect to a longitudinal axis of the second coolant return header 502*b*.

The coolant supply line 420 is connected to both the first coolant supply header 501*a* and the second coolant supply header 501*b*. The coolant supply headers 501*a* and 501*b* are the only supply headers in the coolant distribution system 500. The first coolant return header 502*a* and the second coolant return header 502*b* are both connected to the coolant return line 421. The first coolant return header 502*a* and the second coolant return header 502*b* are the only return headers in the coolant distribution system 500. There are no sub-headers in the system 500. The coolant supply line 420 connects with the first coolant supply header 501*a* and the second coolant supply header 501*b* proximate the third side 103 of the loop slurry reactor 100, while the coolant return line 421 connects with the first coolant return header 502*a* and the second coolant return header 502*b* proximate the fourth side 104 of the loop slurry reactor 100. Connecting lines 420 and 421 to the headers 501*a*, 501*b*, 502*a*, and 502*b* on opposite sides 103 and 104 of the loop slurry reactor 100 is contrasted with the coolant distribution system 200 of FIG. 2, where the coolant supply line 201 and coolant return line 213 connect to piping only on the third side 103 of the loop slurry reactor 100.

The headers in the systems 400 and 500 of FIGS. 4 and 5 have been described as extending along the first side 101 or the second side 102 of the loop slurry reactor 100.

In aspects, a header that "extends along", or is "extending along" the first side 101 or the second side 102 of the loop slurry reactor 100 can be i) parallel with respect to the side 101 or 102 of the loop slurry reactor 100, ii) substantially parallel (e.g., +/−10° from parallel) with respect to the side 101 or 102 of the loop slurry reactor 100, or iii) at an angle in the range of 10°-45° with respect to the side 101 or 102 of the loop slurry reactor 100. For example, the first side 101 and the second side 102 of the loop slurry reactor 100 as depicted in the figures herein are linear, such that when viewed from the third side 103 (see, e.g., FIGS. 6-7), all the vertical legs 111 of the loop slurry reactor 100 are aligned such that only the two vertical legs 111 on third side 103 can be seen, while all the other vertical legs 111 are behind the two vertical legs 111 on third side 103. In such case, the header can extend along the first side 101 or the second side 102 such that the header is: i) parallel with respect to the side 101 or 102 of the loop slurry reactor 100, ii) substantially parallel (e.g., +/−10° from parallel) with respect to the side 101 or 102 of the loop slurry reactor 100, or iii) at an angle in the range of 10°-45° with respect to the side 101 or 102 of the loop slurry reactor 100.

In other aspects, a header that "extends along", or is "extending along" a side 101 or 102 of the loop slurry reactor 100 can follow a contour of the side 101 or 102 of the loop slurry reactor 100. For example, the side 101 or side 102 of the loop slurry reactor 100 may have a curvature or contour, and the header can be configured to follow the curvature or contour of the side 101 or 102. By "follow a curvature", it is meant that the header has the same curvature as the respective side of the loop slurry reactor 100 that the header is on. Alternatively, "follows a contour" can mean the distance between the side of the loop slurry reactor 100 and the header is the same for the entire length of the side of the loop slurry reactor 100.

In additional or alternative aspects, a header that "extends along", or is "extending along" a side 101 or 102 of the loop slurry reactor 100 can satisfy the following equation:

$$0 \le \left(X^2 + Y^2\right)^{0.5} \le Z \qquad (1)$$

where X is the horizontal distance between any point on the side 101 or 102 of the loop slurry reactor 100 and any point along a longitudinal axis of the coolant supply header or coolant return header that is on the respective side 101 or 102, where Y is the vertical distance between the bottom of the loop slurry reactor 100 and the top of the coolant supply header or coolant return header, and where Z is 12.2 ft when X and Y are measured in ft or 3.72 m when X and Y are measured in meters.

Equation (1) is explained with reference to FIG. 6. FIG. 6 illustrates a side view of the coolant distribution system 400 of FIG. 4, viewed from the third side 103 of the loop slurry reactor 100. The coolant supply header 401 can be seen on the first side 101 of the loop slurry reactor 100, and the coolant return header 402 can be seen on the second side 102 of the loop slurry reactor 100. Cooling jacket 1 can be seen wrapped around one of the vertical legs 111, and cooling jacket 16 can be seen wrapped around another of the vertical legs 111. Cooling jackets 1 and 16 are the pair of cooling jackets in coolant pass 410a illustrated in FIG. 4.

The bottom 601 of the loop slurry reactor 100 is above the ground G by a height H that can be in the range of from 3 ft to 10 ft (0.914 m to 3.048 m); alternatively, 3 ft to 9 ft (0.914 m to 2.74 m); alternatively, 3 ft to 8 ft (0.914 m to 2.44 m); alternatively, 3 ft to 7 ft (0.914 m to 2.13 m); alternatively, 4 ft to 6 ft (1.21 m to 1.83 m). In context of header 401, X is the horizontal distance in feet or meters between the longitudinal axis 603a of header 401 and the side 101 of the loop slurry reactor 100, and Y is the vertical distance in feet or meters between the top 602a of the header 401 and the bottom 601 of the loop slurry reactor 100. In context of header 402, X is the horizontal distance in feet or meters between the longitudinal axis 603b of header 402 and the side 102 of the loop slurry reactor 100, and Y is the vertical distance in feet or meters between the top 602b of the header 402 and the bottom 601 of the loop slurry reactor 100.

While header 401 and header 402 are shown proximate the ground G in FIG. 6 and distance Y is between the bottom of the loop slurry reactor 100 and ground G, other embodiments contemplate that the headers 401 and 402 can be elevated above the ground G, for example, 1, 2, 3, 4, 5, 6, 7, 8, or 9 m above the bottom of the loop slurry reactor 100. In such embodiments, Equation (1) can be satisfied for elevated headers, and Y in those embodiments would be a distance that is between the bottom of the loop slurry reactor 100 and the top of the elevated coolant supply header or elevated coolant return header.

FIG. 6 can be used to describe the flow of coolant in coolant passes 410a-h of FIG. 4.

For coolant pass 410a, coolant flows through coolant supply header 401, through inlet conduit 403a (which is connected to the top 602a of the coolant supply header 401) to the bottom 1a of the cooling jacket 1, upward through the cooling jacket 1 from the bottom 1a to the top 1b of the cooling jacket 1, into and through the middle conduit 404a, into the top 16b of the cooling jacket 16, downward through the cooling jacket 16 from the top 16b to the bottom 16a, through the outlet conduit 405a (which is connected to the top 602b of coolant return header 402), and into the coolant return header 402. The flow of coolant through coolant passes 410b-h is similar to that described for coolant pass 410a.

Equation (1) can also be explained with reference to FIG. 7. FIG. 7 illustrates a side view of the coolant distribution system 500 of FIG. 5, viewed from the third side 103 of the loop slurry reactor 100. The coolant supply header 501a and coolant return header 502b can be seen on the first side 101 of the loop slurry reactor 100, and the coolant supply header 501b and the coolant return header 502a can be seen on the second side 102 of the loop slurry reactor 100. Cooling jacket 1 can be seen wrapped around one of the vertical legs 111, and cooling jacket 16 can be seen wrapped around another of the vertical legs 111. Cooling jackets 1 and 16 are the pair of cooling jackets in coolant pass 510a illustrated in FIG. 5. Behind cooling jackets 1 and 16 are cooling jackets 2 and 15, which are the pair of cooling jackets in coolant pass 510e illustrated in FIG. 5.

The bottom 601 of the loop slurry reactor 100 is above the ground G by a height H, as described for FIG. 6. For header 501a, X is the horizontal distance in feet or meters between the longitudinal axis 703a of header 501a and the side 101 of the loop slurry reactor 100, and Y is the vertical distance in feet or meters between the top 702a of the header 501a and the bottom 601 of the loop slurry reactor 100. For header 501b, X is the horizontal distance in feet or meters between the longitudinal axis 703b of header 501b and the side 102 of the loop slurry reactor 100, and Y is the vertical distance in feet or meters between the top 702b of the header 501b and the bottom 601 of the loop slurry reactor 100. For header 502a, X is the horizontal distance in feet or meters between the longitudinal axis 703d of header 502a and the side 102 of the loop slurry reactor 100, and Y is the vertical distance in feet or meters between the top 702d of the header 502a and the bottom 601 of the loop slurry reactor 100. For header 502b, X is the horizontal distance in feet or meters between the longitudinal axis 703c of header 502d and the side 101 of the loop slurry reactor 100, and Y is the vertical distance in feet or meters between the top 702c of the header 502b and the bottom 601 of the loop slurry reactor 100. Equation (1) is satisfied by finding values for X and Y are greater than or equal to 0 and less than or equal to Z (the values for Z being previously described).

FIG. 7 can be used to describe the flow of coolant in coolant passes a-h of FIG. 5.

For coolant pass 510*a*, coolant flows through first coolant supply header 501*a*, through inlet conduit 503*a* (which is connected to the top 702*a* of the first coolant supply header 501*a*) to the bottom 1*a* of the cooling jacket 1, upward through the cooling jacket 1 from the bottom 1*a* to the top 1*b* of the cooling jacket 1, into and through the middle conduit 504*a*, into the top 16*b* of the cooling jacket 16, downward through the cooling jacket 16 from the top 16*b* to the bottom 16*a*, through the outlet conduit 505*a* (which is connected to the top 702*d* of coolant return header 502*a*), and into the first coolant return header 502*a*. The flow of coolant through coolant passes 510*b-d* is similar to that described for coolant pass 510*a*.

For coolant pass 510*e* (which is behind the pair 510*a* in the view shown in FIG. 7), coolant flows through second coolant supply header 501*b*, through inlet conduit 503*e* (which is connected to the top 702*b* of the second coolant supply header 501*b*) to the bottom of the cooling jacket 15 (seen in FIG. 5), upward through the cooling jacket 15 from the bottom to the top of the cooling jacket 15, into and through the middle conduit 504*e* (seen in FIG. 5), into the top of the cooling jacket 2 (seen in FIG. 5), downward through the cooling jacket 2 from the top to the bottom, through the outlet conduit 505*e* (which is connected to the top 702*c* of the coolant return header 502*b*), and into the second coolant return header 502*b*. The flow of coolant through coolant passes 510*f-h* is similar to that described for coolant pass 510*e*.

Values for the diameter of the inlet conduits 403*a-h* and 503*a-h*, middle conduits 404*a-h* and 504*a-h*, and outlet conduits 405*a-h* and 505*a-h* can be independently selected from a value in the range of 12 to 20 inches; alternatively, in the range of 14 to 18 inches; alternatively, 16 inches.

Values for the diameter of the headers 401, 402, 501*a*, 501*b*, 502*a*, and 502*b* can be independently selected from a value in the range of 36 to 48 inches; alternatively, 40 to 44 inches; alternatively, about 42 inches.

In aspects, the length of piping/conduit in the coolant distribution system 400 or 500 relative to polyolefin output capacity of the loop slurry reactor 100 can be less than 400, 300, 200, or 100 m/1,000 kTA; alternatively, can be greater than 10, 20, 30, 40, or 50 m/1,000 kTA; alternatively, can be greater than 10, 20, 30, 40, or 50 m/1,000 kTA and less than 400, 300, 200, or 100 m/1000 kTA.

In aspects, the volume of coolant that can flow in the coolant distribution system 400 or 500 relative to polyolefin output capacity of the loop slurry reactor 100 can be less than 90, 80, or 70 m³/1,000 kTA; alternatively, greater than 10, 20, 30, 40, or 50 m³/1,000 kTA; alternatively, greater than 10, 20, 30, 40, or 50 m³/1,000 kTA and less than 90, 80, or 70 m³/1,000 kTA.

In aspects, the length of piping/conduit in the coolant distribution system 400 or 500 having a configuration according to this disclosure (e.g., having no sub-headers) is less than 60, 50, 40, or 30% of the length of piping/conduit in the coolant distribution system 200 (e.g., having sub-headers). Utilizing a smaller length of piping provides a lower capital cost when installing a new cooling system and provides a lower pressure drop across the coolant loop due to the shorter coolant flow path.

In aspects, the volume of the coolant distribution system 400 or 500 having a configuration according to this disclosure (e.g., having no sub-headers) is less than 85, 84, 83, 82, 81, 80, 79, 78, or 77% of the volume of the coolant distribution system 200 (e.g., having sub-headers). A smaller volume requires less coolant in the system 400 or 500.

In aspects, the system 400 or 500 contains no 90 degree bends of conduit or piping. Utilizing fewer number of piping components provides a lower capital cost when installing a new cooling system and provides a lower pressure drop across the coolant loop which results in lower energy consumption and operating cost.

In aspects, the pressure drop across the coolant distribution system 400 or 500 (e.g., from the inlet of the coolant supply header to the outlet of the coolant return header) is less than 5, 4, 3, 2, or 1 bar(g) and greater than 0, 0.1, 0.2, 0.3, 0.4, or 0.5 bar(g). A lower pressure drop results in lower power requirements for the pump(s) that circulate the coolant through the coolant distribution system.

A further advantage of the coolant distribution systems 400 and 500 described herein is that the above benefits and advantages are achieved when used in combination with world-scale loop slurry reactors and also when used in combination with smaller loop slurry reactors, because the configurations uses less piping/conduit, lower volume of coolant, and have a lower pressure drop than a traditionally-designed coolant distribution system would have on the same reactor, regardless of reactor size. Lower volume of coolant in the system provides shorter response time in reactor temperature control system and results in more robust reactor temperature control. Stated alternatively, traditionally-designed coolant distribution systems, such as the system 200 shown in FIG. 2, have disadvantages described herein for larger, global-scale polymerization reactors; whereas, the coolant distribution systems 400 and 500 described herein provide the benefits and advantages described herein across the whole spectrum of reactor sizes when compared to the use of a traditionally-designed coolant distribution system applied to a given size of reactor.

FIG. 8 illustrates a process flow diagram of a coolant temperature control system 800 according to the disclosure. The coolant temperature control system 800 can include a coolant return conduit 213/421 coupled to a first plurality of cooling jackets of a loop slurry reactor (examples of the cooling jackets and loop slurry reactor are discussed below), a heat exchanger 810 connected to the coolant return conduit 213/421 and configured to cool warmed coolant received from the coolant return conduit 213/421 to form a cooled coolant, a steam heater 820 coupled to the heat exchanger 810 and configured to i) heat the cooled coolant to form a temperature adjusted coolant, or ii) allow the cooled coolant to pass through without heating to form the temperature adjusted coolant, and a coolant supply conduit 201/420 coupled to the steam heater 820 and to a second plurality of cooling jackets of the loop slurry reactor, wherein the first plurality of cooling jackets are fluidly coupled to the second plurality of cooling jackets, and wherein the heat exchanger 810 and the steam heater 820 are fluidly coupled to one another in series and not in parallel with respect to the direction of flow of the first coolant in the system 800.

The loop slurry reactor in the coolant temperature control system 800 can be the loop slurry reactor 100 discussed herein. With reference to FIG. 2, the first plurality of cooling jackets coupled with the coolant temperature control system 800 can be cooling jackets 2, 4, 6, 8, 10, 12, 14, and 16, and the second plurality of cooling jackets can be cooling jackets 1, 3, 5, 7, 9, 11, 13, and 15. With reference to FIG. 4, the first plurality of cooling jackets coupled with the coolant control system 800 can be cooling jackets 9-16, and the second plurality of cooling jackets can be cooling jackets 1-8. With reference to FIG. 5, the first plurality of cooling jackets coupled with the coolant temperature control system 800 can be cooling jackets 2, 4, 6, 8, 10, 12, 14, and 16, and the second plurality of cooling jackets can be cooling jackets 1, 3, 5, 7, 9, 11, 13, and 15.

As can be seen in FIG. 8, the steam heater 820 is downstream of the heat exchanger 810 with respect to a direction of flow of the coolant through the coolant temperature control system 800. The warmed coolant in conduit 213/421, the cooled coolant in conduit 813, and the temperature adjusted coolant in conduit 201/420 flow outside the loop slurry reactor 100 in a single coolant flowpath containing the heat exchanger 810 and the steam heater 820.

The heat exchanger 810 can be embodied as one or more heat exchange zones connected in series and/or parallel. The heat exchange zone(s) can be embodied as any configuration of heat exchanger known in the art with the aid of this disclosure, such as shell and tube configuration, plate configuration, finned configuration, or any combination thereof. Generally, the heat exchanger 810 can have a "first side" that is fluidically isolated from a "second side". A structure within the heat exchanger 810 such as tubes, plates, or baffles fluidly separate the "first side" from the "second side" so that heat exchanges between the reactor coolant on the first side and a second coolant on the second side via the structure. The warmed coolant (also referred to as first coolant or reactor coolant) in system 800 is received in the heat exchanger 810 via return line 213/431 (also referred to as the first coolant inlet conduit) on the first side of the heat exchanger 810 and discharged via first coolant outlet conduit 813 on the first side of the heat exchanger 810. The second coolant that is used by the heat exchanger 810 to cool the first coolant is received in the heat exchanger 810 via second coolant inlet conduit 811 on the second side of the heat exchanger 810 and discharged from the heat exchanger 810 via the second coolant outlet conduit 812 on the second side of the heat exchanger 810. The second coolant can be embodied as plant cooling water that is readily available in an olefin polymerization plant.

The second coolant inlet conduit 811 containing the second coolant can be connected to an inlet on the second side of the heat exchanger 810 and configured to supply the second coolant to the second side of the heat exchanger 810. The second coolant outlet conduit 812 can be connected to an outlet of the heat exchanger 810 and configured to return the warmed second coolant to the supply (e.g., a tank, reservoir, or other process in the plant) of the second coolant from where the second coolant was obtained. The heat exchanger 810 is configured to cool the warmed first coolant received from coolant return line 213/421 within the first side of the heat exchanger 810 and to produce a cooled first coolant flowing in conduit 813 that is connected to an outlet on the first side of the heat exchanger 810. Generally, the temperature of the first coolant in line 213/421 is greater than a temperature of the first coolant in conduit 813. Generally, the temperature of the second coolant in conduit 811 is less than a temperature of the second coolant in conduit 812.

Cooled first coolant flows in conduit 813 to the steam heater 820. The steam heater 820 can be embodied as any heater configured to use steam as the heat source to heat the cooled first coolant. For example, steam heater 820 can be embodied as a steam injection heater that is configured to inject steam directly into the fluid flowing therein, so as to heat the fluid that flows therethrough. This configuration of a steam heater 820 is also commercially known as a direct steam injection heater. Alternatively, steam heater 820 can also be embodied as a heat exchanger having one or more heat exchange zones connected in series and/or parallel. The heat exchange zone(s) can be embodied as any configuration of heat exchanger known in the art with the aid of this disclosure, such as shell and tube configuration, plate configuration, finned configuration, or any combination thereof. Generally, the steam heater 820 embodied as a heat exchanger can have a "first side" that is fluidically isolated from a "second side". A structure within the heat exchanger such as tubes, plates, or baffles fluidly separate the "first side" from the "second side" so that heat exchanges between the reactor coolant on the first side and a second coolant on the second side via the structure. Steam on one side of the steam heater 820 can be used to heat the coolant on the other side of the steam heater 820, without steam that supplies the heat mixing with the coolant.

A steam conduit 821 is connected to the steam heater 820 and is configured to supply steam to the steam heater 820. Conduit 821 includes a valve 822 that is configured to actuate in a range of from 0% to 100% open so as to allow, disallow, increase, decrease, or a combination thereof, a flow of steam into the steam heater 820. That valve 822 is coupled to a control device 830.

The control device 830 is configured to control the flow of steam in conduit 821 by actuation of the valve 822 so as to control steam injection into the steam heater 820. The control device 830 can be embodied as one or more computers having a processor, memory, and instructions stored on the memory that are executed by the processor so as to perform the functions for the control device 830 described herein. The control device 830 may be in the form of a programmable logic controller (PLC), alone or integrated in a distributed control system (DCS). The instructions stored in the control device 830 can be programmed in any language and any architecture including neural network architecture.

Actuation of the valve 822 by the control device 830 can be based upon a temperature of the cooled coolant in conduit 813 relative to a threshold or setpoint value, a temperature of the temperature adjusted coolant in coolant supply line 201/420 relative to a threshold or setpoint value, a temperature of the loop slurry reactor 100 relative to a set temperature operating range and/or maximum operating temperature, or a combination thereof.

The temperature of the cooled coolant can be measured by the system 800 using a sensor 814 (e.g., a thermocouple) placed in conduit 813, the sensor 814 being coupled to the control device 830. The temperature of the temperature adjusted coolant can be measured by the system 800 using a sensor 815 (e.g., a thermocouple) placed in coolant supply line 201/420, the sensor 815 being coupled to the control device 830. The temperature of the loop slurry reactor 100 can be measured by the system 800 using one or more sensors 816a-n placed in the loop slurry reactor 100, each of the one or more sensors 816a-n being coupled to the control device 830

The sensor 814 is configured to provide a signal to the control device 830 that is representative of the temperature of the cooled coolant in the conduit 813, the sensor 815 is configured to provide a signal to the control device 830 that is representative of the temperature of the temperature adjusted coolant in line 201/420, and the sensor(s) 816a-n is configured to provide a signal to the control device 830 that is representative of the temperature of the reaction mixture in the loop slurry reactor 100. The control device 830 can be configured to convert the signals to a temperature value, and then the control device 830 can compare the temperature values to threshold or setpoint values (or an operating range such as in the case for reactor temperature) that are programmed in the control device 830.

In cooling operation, if the temperature of the cooled first coolant in conduit 813 is below a first threshold or first setpoint value and/or if the temperature of the loop slurry reactor 100 is below a second threshold or second setpoint value or is decreasing too quickly, then the control device 830 can be configured to actuate valve 822 to allow or increase a flow of steam in conduit 821 to the steam heater 820. This might occur in a scenario of excessive reactor cooling, and preventing the loop slurry reactor 100 from falling below a threshold temperature may prevent off-spec polyolefin production, for example. The flow of steam can be maintained until sensor 815 in line 201/420 provides a signal to the control device 830 that the temperature of the temperature adjusted coolant is at or above a third threshold or third setpoint value and/or sensor(s) 816a-n provide a signal to the control device 830 that the temperature of the loop slurry reactor 100 is at or above a fourth threshold or fourth setpoint value for the reactor temperature. Once the second and/or fourth threshold or setpoint value(s) is/are reached, the control device 830 can be configured to actuate valve 822 to decrease (or stop, discontinue, or disallow) the flow of steam in conduit 821 to the steam heater 820.

If the temperature of the cooled coolant is above a fifth threshold or fifth setpoint value and/or the loop slurry reactor 100 is above a sixth threshold or sixth setpoint value, then the control device 830 can be configured to decrease or disallow a flow of steam in conduit 821 to the steam heater 820. This might occur in a scenario of inadequate reactor cooling, and preventing the loop slurry reactor 100 from exceeding a particular temperature (that is the sixth threshold temperature or can be above the sixth threshold temperature) may prevent the polyolefin product from melting and sticking to the walls of the reactor or downstream equipment, causing fouling or plugging. The flow of steam can be maintained until sensor 815 and/or sensor(s) 816a-n sends a signal to the control device 830 that the temperature of the temperature adjusted coolant is at or below a seventh threshold or seventh setpoint value and/or the loop slurry reactor 100 is at or below an eighth threshold or eighth setpoint value. Once the seventh and/or eighth threshold or setpoint value is/are reached, the control device 830 can be configured to actuate valve 822 to open and allow the flow of steam to the steam heater 820, or to open further so as to increase the flow of steam to the steam heater 820.

The first to fourth threshold values and first to fourth setpoint values are generally lower than the fifth to eighth threshold values and fifth to eighth setpoint values.

The present disclosure contemplates that the temperature control system 800 can be used for heating the loop slurry reactor 100 during reactor startup. In these aspects, "startup" of the loop slurry reactor 100 generally involves filling the loop slurry reactor 100 with liquid (e.g., propylene for polymerization of propylene or isobutane for polymerization of ethylene). The liquid is then circulated through the loop and heated until the desired polymerization temperature or a threshold minimum temperature for polymerization is reached, e.g., a temperature in the range of 80° C. to 105° C. The reaction components (e.g., monomer, catalyst, co-catalyst, electron donor, or combinations thereof) are then added to the heated liquid in the loop slurry reactor 100 to form the reaction mixture and to initiate polymerization reactions at the desired temperature. The temperature adjusted coolant can act as a heating medium for heating the liquid in the reactor during startup, and the steam heater 820 can inject steam to supply the heat to the loop slurry reactor 100 via the cooling jackets (called cooling jackets because the primary function of the jackets is to cool the loop slurry reactor 100 while exothermic polymerization reactions take place in the loop slurry reactor 100). In heating operation, such as during reactor startup, the sensor(s) 816a-n can be configured to provide a signal to the control device 830 that is representative of the temperature of reaction mixture in the loop slurry reactor 100, and the sensor 815 can be configured to provide a signal to the control device 830 that is representative of the temperature of the temperature adjusted coolant in line 201/420. The control device 830 can be configured to convert the signal to a temperature value and then compare the temperature value to a threshold or setpoint value that is programmed in the control device 830. The control device 830 can be configured to actuate valve 822 to an open position or to a further open position if the valve 822 is already open to some degree, allowing a flow of steam into the first coolant so that the temperature in line 201/420 is sufficient for heating the loop slurry reactor 100 until a threshold temperature value is reached and detected by the sensor(s) 816a-n in the loop slurry reactor 100.

In aspects, the control of the valve 822 is accomplished by system 800 with a constant flow of the second coolant on the second side of the heat exchanger 810 such that valve 822 is the only valve used to control the temperature of the first coolant in lines 213/421, 813, and 201/420 in the system 800. Coolant temperature control is simplified from using the three valves 304, 305, and 306 as shown in FIG. 3 to using one valve 822.

By having the heat exchanger 810 connected to the coolant return line 213/421, it is contemplated that the system 800 is the only temperature control system used to cool/control the temperature of the reactor coolant such that all the warmed reactor coolant flows from the first plurality of cooling jackets to the heat exchanger 810 in system 800 (i.e., the simplification of system 800 over system 300 is not sacrificed by using multiple systems 800 in series or parallel for the same reactor).

Also disclosed herein is a coolant distribution process. The process is described with respect to the components of systems 400 and 500 disclosed herein. A slash "/" might be used to separate the reference numerals for system 400 to the left of the slash from the reference numerals for system 500 to the right of the slash. For example, a reference to "first cooling jacket 1-8/1, 3, 5, 7" means that the first cooling jacket of the features in discussion can be any cooling jacket 1 to 8 in system 400 of FIG. 4 or any cooling jacket 1, 3, 5, or 7 in system 500 of FIG. 5.

The coolant distribution process is performed for cooling a plurality of vertical legs 111 in a loop slurry reactor 100, the loop slurry reactor 100 having a first side 101 opposite of a second side 102 and a third side 103 opposite of a fourth side 104, wherein the first side 101 and the second side 102 are perpendicular to the third side 103 and the fourth side 104.

The process can include flowing coolant to a first coolant supply header 401/501a extending along the first side 101 of the loop slurry reactor 100; flowing coolant from a first coolant return header 402/502a extending along the second side 102 of the loop slurry reactor 100; and flowing coolant from the first coolant supply header 401/501a to the first coolant return header 402/502a via a first plurality of coolant passes 410a-h/510a-d; wherein each of the first plurality of coolant passes 410a-h/510a-h is configured to i) exchange heat with a first pair of the plurality of vertical legs 100, ii) receive coolant from the first coolant supply header 401/501a on the first side 101 of the loop slurry reactor 100, and iii) return coolant to the first coolant return header 402/502*a* on the second side 102 of the loop slurry reactor 100.

In aspects of the coolant distribution process, the first coolant supply header 401/501*a* is the only coolant supply header on the first side 101 of the loop slurry reactor 100, and the first coolant return header 402/502*a* is the only coolant return header on the second side 102 of the loop slurry reactor 100. In further aspects, the first coolant supply header 401 is the only coolant supply header and the first coolant return header 402 is the only coolant return header in the coolant distribution system 400.

In aspects of the coolant distribution process, coolant flows to the first coolant supply header 401/501*a* by approach to the third side 103 of the loop slurry reactor 100, and coolant flows from the first coolant return header 402/502*a* away from the fourth side 104 of the loop slurry reactor 100.

In aspects of the coolant distribution process each of the first plurality of coolant passes 410*a-h*/510*a-d* comprises: an inlet conduit 403*a-h*/503*a-d* connected to the first coolant supply header 401/501*a*; a first cooling jacket 1-8/1, 3, 5, 7 wrapped around at least a portion of one of the first pair of the plurality of vertical legs 111, wherein the first cooling jacket 1-8/1, 3, 5, 7 is connected to the inlet conduit 403*a-h*/503*a-d*; a middle conduit 404*a-h*/504*a-d* connected to the first cooling jacket 1-8/1, 3, 5, 7; a second cooling jacket 16-9/16, 14, 12, 10 wrapped around at least a portion of another of the first pair of the plurality of vertical legs 111, wherein the second cooling jacket 16-9/16, 14, 12, 10 is connected to the middle conduit 404*a-h*/504*a-d*; and an outlet conduit 405*a-h*/505*a-d* connected to the second cooling jacket 16-9/16, 14, 12, 10 and the first coolant return header 402/502*a*.

In aspects of the coolant distribution process, flowing coolant from the first coolant supply header 401/501*a* to the first coolant return header 402/502*a* via the first plurality of coolant passes 410*a-h*/510*a-d* comprises: flowing coolant from the first coolant supply header 401/501*a* to the inlet conduit 403*a-h*/503*a-d*; flowing coolant through the inlet conduit 403*a-h*/503*a-d* to the first cooling jacket 1-8/1, 3, 5, 7; flowing coolant through the first cooling jacket 1-8/1, 3, 5, 7 to the middle conduit 404*a-h*/504*a-d*; flowing coolant through the middle conduit 404*a-h*/504*a-d* to the second cooling jacket 16-9/16, 14, 12, 10; flowing coolant through the second cooling jacket 16-9/16, 14, 12, 10 to the outlet conduit 405*a-h*/505*a-d*; and flowing coolant from the outlet conduit 405*a-h*/505*a-d* to the first coolant return header 402/502*a*.

In aspects of the coolant distribution process, coolant flows from a bottom of the first cooling jacket 1-8/1, 3, 5, 7 to a top of the first cooling jacket 1-8/1, 3, 5, 7, and coolant flows from a top of the second cooling jacket 16-9/16, 14, 12, 10 to a bottom of the second cooling jacket 16-9/16, 14, 12, 10.

In aspects of the coolant distribution process, a diameter of the inlet conduit 403*a-h*/503*a-d*, a diameter of the middle conduit 404*a-h*/504*a-d*, and a diameter of the outlet conduit 405*a-h*/505*a-d* of each of the first plurality of coolant passes 410*a-h*/510*a-d* are about equal.

In aspects of the coolant distribution process, the inlet conduit 403*a-h*/503*a-d* and the outlet conduit 405*a-h*/505*a-d* of each of the first plurality of coolant 410*a-h*/510*a-d* passes are parallel to one another.

In aspects of the coolant distribution process, a longitudinal axis of the inlet conduit 403*a-h*/503*a-d* of each of the first plurality of coolant passes 410*a-h*/510*a-d* extends at an angle in the range of 1°-179° with respect to a longitudinal axis of the first coolant supply header 401/501*a*, and a longitudinal axis of the outlet conduit 405*a-h*/505*a-d* of each of the first plurality of coolant passes 410*a-h*/510*a-d* extends at an angle in the range of 1°-179° with respect to a longitudinal axis of the first coolant return header 402/502*a*.

In aspects of the coolant distribution process, a flow of coolant through the first cooling jacket (jackets 1-8 of FIG. 4) and through the second cooling jacket (jackets 16-9 of FIG. 4) of each of the first plurality of coolant passes 410*a-h* is co-current (jackets 2, 4, 6, 8 for FIG. 4) or counter-current (jackets 1, 3, 5, 7 of FIG. 4) with respect to a flow of reaction mixture in the plurality of vertical legs 111 of the loop slurry reactor 100. For example, in the process used in system 400 of FIG. 4, a flow of coolant through the first cooling jacket 2, 4, 6, 8 and second cooling jacket 15, 13, 11, 9 of coolant passes 410*b,d,f,h* is co-current with respect to a flow of reaction mixture in the plurality of vertical legs 111 of the loop slurry reactor 100; and a flow of coolant through the first cooling jacket 1, 3, 5, 7 and second cooling jacket 16, 14, 12, 10 of coolant passes 410*a,c,e,g* is counter-current with respect to a flow of reaction mixture in the plurality of vertical legs 111 of the loop slurry reactor 100.

In aspects of the coolant distribution process, the flow of coolant through the first cooling jacket (1, 3, 5, 7 of FIG. 5) and through the second cooling jacket (16, 14, 12, 10 of FIG. 5) of each of the first plurality of coolant passes 510*a-d* is only counter-current with respect to the flow of reaction mixture in the plurality of vertical legs 111 of the loop slurry reactor 100 that the jackets 1, 3, 5, 7, 16, 14, 12, 10 are wrapped around.

In aspects of the coolant distribution process, a flow of coolant through the first cooling jacket and through the second cooling jacket of each of the first plurality of coolant passes is only co-current with respect to a flow of reaction mixture in the plurality of vertical legs of the loop slurry reactor.

In aspects of the coolant distribution process, flowing coolant to a second coolant supply header 501*b* extending along the second side 102 of the loop slurry reactor 100; flowing coolant from a second coolant return header 502*b* extending along the first side 101 of the loop slurry reactor 100; and flowing coolant from the second coolant supply header 501*b* to the second coolant return header 502*b* via a second plurality of coolant passes 510*e-h*. Each of the second plurality of coolant passes 510*e-h* is configured to i) exchange heat with a second pair of the plurality of vertical legs 111, ii) receive coolant from the second coolant supply header 501*b* on the second side 102 of the loop slurry reactor 100, and iii) return coolant to the second coolant return header 502*b* on the first side 101 of the loop slurry reactor 100.

In aspects of the coolant distribution process, coolant flows to the second coolant supply header 501*b* by approach to the third side 103 of the loop slurry reactor 100, and coolant flows from the second coolant return header 502*b* away from the fourth side 104 of the loop slurry reactor 100.

In aspects of the coolant distribution process, each of the second plurality of coolant passes 510*e-h* comprises an inlet conduit 503*e-h* connected to the second coolant supply header 501*b*; a first cooling jacket 15, 13, 11, 9 wrapped around at least a portion of one of the second pair of the plurality of vertical legs 111, wherein the first cooling jacket 15, 13, 11, 9 is connected to the inlet conduit 503*e-h*; a middle conduit 504*e-h* connected to the first cooling jacket 15, 13, 11, 9; a second cooling jacket 2, 4, 6, 8 wrapped around at least a portion of another of the second pair of the plurality of vertical legs 111, wherein the second cooling jacket 2, 4, 6, 8 is connected to the middle conduit 504*e*-*h*; and an outlet conduit 505*e*-*h* connected to the second cooling jacket 2, 4, 6, 8 and to the first coolant return header 502*b*.

In aspects of the coolant distribution process, a diameter of the inlet conduit 503*e*-*h*, a diameter of the middle conduit 504*e*-*h*, and a diameter of the outlet conduit 505*e*-*h* of each of the second plurality of coolant passes 510*e*-*h* are about equal.

In aspects of the coolant distribution process, each of the inlet conduit 503*e*-*h* and the outlet conduit 505*e*-*h* of each of the second plurality of coolant passes 510*e*-*h* are parallel to one another.

In aspects of the coolant distribution process, a longitudinal axis of the inlet conduit 503*e*-*h* of each of the second plurality of coolant passes 510*e*-*h* extends at an angle in the range of 1°-179° with respect to a longitudinal axis of the second coolant supply header 501*b*, and a longitudinal axis of the outlet conduit 505*e*-*h* extends at an angle in the range of 1°-179° with respect to a longitudinal axis of the second coolant return header 502*b*.

In aspects of the coolant distribution process, flowing coolant from the second coolant supply header 501*b* to the second coolant return header 502*b* via the second plurality of coolant passes 510*e*-*h* comprises: flowing coolant from the second coolant supply header 501*b* to the inlet conduit 503*e*-*h*; flowing coolant through the inlet conduit 503*e*-*h* to the first cooling jacket 15, 13, 11, 9; flowing coolant through the first cooling jacket 15, 13, 11, 9 to the middle conduit 504*e*-*h*; flowing coolant through the middle conduit 504*e*-*h* to the second cooling jacket 2, 4, 6, 8; flowing coolant through the second cooling jacket 2, 4, 6, 8 to the outlet conduit 505*e*-*h*; and flowing coolant from the outlet conduit 505*e*-*h* to the second coolant return header 502*b*.

In aspects of the coolant distribution process, coolant flows from a bottom of the first cooling jacket 15, 13, 11, 9 to a top of the first cooling jacket 15, 13, 11, 9, and wherein coolant flows from a top of the second cooling jacket 2, 4, 6, 8 to a bottom of the second cooling jacket 2, 4, 6, 8.

In aspects of the coolant distribution process, flow of coolant through the first cooling jacket 15, 13, 11, 9 and through the second cooling jacket 2, 4, 6, 8 of each of the second plurality of coolant passes 510*e*-*h* is only countercurrent with respect to the flow of reaction mixture in the plurality of vertical legs 111 of the loop slurry reactor 100 that the jackets 2, 4, 6, 8, 9, 11, 13, 15 are wrapped around.

Also disclose is a coolant temperature control process for controlling a temperature of a coolant. The temperature control process can include flowing a temperature adjusted coolant through a first plurality of cooling jackets (e.g., jackets 1-8 in FIG. 4 or jackets 1, 3, 5, 7, 9, 11, 13, 15 in FIG. 5) and then a second plurality of cooing jackets (e.g., jackets 9-16 in FIG. 4 or jackets 2, 4, 6, 8, 10, 12, 14, 16 in FIG. 5) to form a warmed coolant, wherein the first plurality of cooling jackets and the second plurality of cooling jackets are placed around a plurality of vertical legs 111 of a loop slurry reactor 100; flowing the warmed coolant from the second plurality of cooling jackets to a heat exchanger 810; cooling the warmed coolant in the heat exchanger 810 to form a cooled coolant; passing the cooled coolant through a steam heater 820 to form the temperature adjusted coolant; and flowing the temperature adjusted coolant to the first plurality of cooling jackets, where the heat exchanger 810 and the steam heater 820 are fluidly coupled to one another in series and not in parallel, with respect to the direction of flow of the first coolant through the heat exchanger 810 and the steam heater 820.

In aspects of the coolant temperature control process, the steam heater 820 is downstream of the heat exchanger 810 with respect to a direction of flow of the coolant through the heat exchanger 810 and the steam heater 820.

In aspects of the coolant temperature control process, the warmed coolant and the cooled coolant flow outside the loop slurry reactor 100 in a single coolant flowpath containing the heat exchanger 810 and the steam heater 820.

In aspects of the coolant temperature control process, all the warmed coolant flows from the second plurality of cooling jackets to the heat exchanger 810.

In aspects of the coolant temperature control process, the process also includes heating the cooled coolant with the steam heater 820 to form the temperature adjusted coolant; and heating the loop slurry reactor 100 with the temperature adjusted coolant during startup of the loop slurry reactor 100 until a polymerization temperature is reached in the loop slurry reactor 100. Reactor startup and other features that may accompany these aspects of the process are discussed in the description for the temperature control system 800.

In aspects of the coolant temperature control process, the process also includes maintaining a temperature of the loop slurry reactor 100 during steady state operation of the loop slurry reactor 100. To do so, the process can include determining a temperature of the cooled coolant is below a low threshold value; and heating the cooled coolant with the steam heater 820 to form the temperature adjusted coolant. Alternatively, the process can include determining a temperature of the cooled coolant is at or above a high threshold value, and not heating the cooled coolant with the steam heater 820.

In aspects of the coolant temperature control process, the heat exchanger 810 is configured to provide heat exchange contact between the warmed coolant and a second coolant. The second coolant be or include water.

In aspects of the coolant temperature control process, the process can further include warming the second coolant in the heat exchanger 810 by the heat exchange contact between the warmed coolant and the second coolant to form a warmed second coolant; and flowing the warmed second coolant to a supply of the second coolant.

In aspects of the coolant temperature control process, the process can further include polymerizing an olefin in the loop slurry reactor 100, wherein the olefin comprises ethylene or propylene.

EXAMPLES

Aspects of the invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

For the following examples, simulations were performed with Aspen Hysys software, in conjunction with proprietary techniques for simulation and calculations.

Comparative Example 1

Example 1 is a comparative example to show features of the coolant distribution system 200 in FIG. 2. The loop slurry reactor 100 in FIG. 2 was simulated for a capacity of 1,000 kTA, and cooling was supplied to the loop slurry reactor 100 by the coolant distribution system 200. The coolant in the simulation of Example 1 was water. The number of tee connections used in the simulation was 16, and the number of 90° bends was 48. The total volume of coolant needed in the piping of the system 200 was 23,113 gallons (87.5 m³) (this amount does not include volume of coolant in the cooling jackets shown in FIG. 2). The total coolant flow rate in Comparative Example 1 was 8,800,000 kg/hr.

Coolant was supplied to the coolant supply headers 202a and 202b at a pressure of 8.4 bar(g). Coolant was received from the coolant return headers 212a and 212b at a pressure of 6.8 bar(g) using the coolant distribution system 200 of FIG. 2. The pressure drop across the system 200 was thus about 1.6 bar.

Example 1

Example 1 was performed to disclose the features of the coolant distribution system 400 in FIG. 4. The loop slurry reactor 100 in FIG. 4 was simulated for a capacity of 1,000 kTA, and cooling was supplied to the loop slurry reactor 100 by the coolant distribution system 400. The coolant in the simulation of Example 1 was water. The number of tee connections used in the simulation was 16, and the number of 90° bends was 0. Blinded tees are used in place of elbows because the piping size changes at the bends. It is also believed that using blinded tees with the appropriate change in piping size for the joint better ensures flow distribution remains uniform. The total volume of coolant needed in system 400 was 17,747 gallons (67.2 m³) (this amount does not include volume of coolant in the cooling jackets shown in FIG. 4). The total coolant flow rate in Example 1 was 8.8×10⁶ kg/hr. The coolant flow rate for each coolant pass was as follows:

TABLE 1

| Coolant Pass in FIG. 4 | Flow rage (kg/hr) | % Average |
|---|---|---|
| 410a | 1,106,939 | 100.6 |
| 410b | 1,104,019 | 100.4 |
| 410c | 1,101,393 | 100.1 |
| 410d | 1,099,285 | 99.9 |
| 410e | 1,098,723 | 99.8 |
| 410f | 1,097,000 | 99.7 |
| 410g | 1,096,706 | 99.7 |
| 410h | 1,096,836 | 99.7 |

Coolant was supplied to the coolant supply header 401 at a pressure of 8.4 bar(g). It was unexpectedly found that coolant was received from the coolant return header 402 at a pressure of 7.3 bar(g) using the coolant distribution system 400 of FIG. 4. The pressure drop across the system 400 was thus about 1.1 bar, which is less than expected for a loop slurry reactor 100 having sixteen vertical legs 111.

Example 2

Example 2 was performed to disclose the features of the coolant distribution system 500 in FIG. 5.

The loop slurry reactor 100 in FIG. 5 was simulated for a capacity of 1,000 kTA, and cooling was supplied to the loop slurry reactor 100 by the coolant distribution system 500. The coolant in the simulation of Example 2 was water. The number of tee connections used in the simulation was 16, and the number of 90° bends was 4. The total volume of coolant needed in system 500 was 15,112 gallons (57.2 m³) (this amount does not include volume of coolant in the cooling jackets shown in FIG. 5). The total coolant flow rate in Example 2 was 8.8×10⁶ kg/hr. The coolant flow rate for each coolant pass was as follows:

TABLE 2

| Coolant Pass in FIG. 5 | Flow rage (kg/hr) | % Average |
|---|---|---|
| 510a | 1,103,521 | 100.3 |
| 510b | 1,100,278 | 100.0 |
| 510c | 1,101,270 | 100.1 |
| 510d | 1,098,317 | 99.8 |
| 510e | 1,099,805 | 100.0 |
| 510f | 1,097,687 | 99.8 |
| 510g | 1,099,524 | 100.0 |
| 510h | 1,099,597 | 100.0 |

Coolant was supplied to the coolant supply headers 501a and 501b at a pressure of 8.4 bar(g). It was unexpectedly found that coolant was received from the coolant return headers 502a and 502b at a pressure of 7.2 bar(g) using the coolant distribution system 500 of FIG. 5. The pressure drop across the system 500 was thus about 1.2 bar, which is less than expected for a loop slurry reactor 100 having sixteen vertical legs 111.

The table below summarizes design features for the coolant distribution systems 200, 400, and 500:

TABLE 3

| Piping Size, in (cm) | Comparative Example 1 Length, ft (m) | Example 1 Length, ft (m) | Example 2 Length, ft (m) |
|---|---|---|---|
| 42 | 0 (0) | 238 (72.5) | 0 (0) |
| 30 | 330 (100.5) | 0 (0) | 398 (121.3) |
| 20 | 268 (81.7) | 0 (0) | 0 (0) |
| 16 | 796 (242.6) | 131 (39.9) | 131 (39.9 |
| All sizes combined (total) | 1393 (424.6) | 369 (112.5) | 528 (160.9) |

The ratio of the length of piping/conduit in the coolant distribution system 500 to the plant capacity was 160.9 m/1,000 kTA, and the ratio of length of piping/conduit in the coolant distribution system 400 to the plant capacity was 112.5 m/1,000 kTA; whereas, the ratio of the length of piping/conduit in the coolant distribution system 200 to the plant capacity was 425 m/1,000 kTA. Moreover, the length of piping/conduit in the coolant distribution system 200 is decreased by (1393-369)/1393*100=74% (at least this amount) for system 400 and (1393-528)/1393*100=62% (at least this amount) for system 500, by utilizing the configuration and techniques disclosed herein. A 74% and 62% decrease in piping/conduit in systems 400 and 500 was unexpected and is a significant reduction in physical conduit/piping that has lower capital cost in installing and maintenance compared with the configuration in coolant distribution system 200.

The ratio of the volume of the coolant distribution system 400 to the plant capacity was 67.2 m³/1,000 kTA, and the ratio of the volume of the coolant distribution system 500 to the plant capacity was 57.2 m³/1,000 kTA; whereas, the ratio of the volume of the coolant distribution system 200 to plant capacity was much larger, i.e., 87.5 m³/1,000 kTA. Moreover, the volume of the coolant distribution system 200 is decreased by (87.5 m³-67.2 m³)/(87.5 m³)*100=23% (at least this amount) in system 400 and by (87.5 m³-57.2 m³)/(87.5 m³)*100=34% (at least this amount) in system 500, by utilizing the configurations and techniques disclosed herein.

The pressure drop in system 200 was 1.6 bar, whereas, the pressure drop in system 400 was 1.1 bar, and the pressure drop in system 500 was 1.2 bar. Both of the disclosed systems 400 and 500 have a lower pressure drop that comparative system 200, which was unexpected. The lower pressure drop means less pumping power is needed for circulation of the coolant in the disclosed systems 400 and 500.

Additional Disclosure

The following is provided as additional disclosure for combinations of features and aspects of the present invention.

Aspect A1 a process for cooling a plurality of vertical legs in a loop slurry reactor, the loop slurry reactor having a first side opposite of a second side and a third side opposite of a fourth side, wherein the first side and the second side are perpendicular to the third side and the fourth side.

Aspect A2 is the process of A1, and includes flowing coolant to a first coolant supply header extending along the first side of the loop slurry reactor, flowing coolant from a first coolant return header extending along the second side of the loop slurry reactor, and flowing coolant from the first coolant supply header to the first coolant return header via a first plurality of coolant passes. In this Aspect A1, each of the first plurality of coolant passes is configured to i) exchange heat with a first pair of the plurality of vertical legs, ii) receive coolant from the first coolant supply header on the first side of the loop slurry reactor, and iii) return coolant to the first coolant return header on the second side of the loop slurry reactor.

Aspect A3 is the process of Aspect A2, wherein the first coolant supply header is the only coolant supply header on the first side of the loop slurry reactor, and wherein the first coolant return header is the only coolant return header on the second side of the loop slurry reactor.

Aspect A4 is the process of any of Aspects A2-A3, wherein coolant flows to the first coolant supply header by approach to the third side of the loop slurry reactor, wherein coolant flows from the first coolant return header away from the fourth side of the loop slurry reactor.

Aspect A5 is the process of any of Aspects A2-A4, wherein each of the first plurality of coolant passes comprises: an inlet conduit connected to the first coolant supply header; a first cooling jacket wrapped around at least a portion of one of the first pair of the plurality of vertical legs, wherein the first cooling jacket is connected to the inlet conduit; a middle conduit connected to the first cooling jacket; a second cooling jacket wrapped around at least a portion of another of the first pair of the plurality of vertical legs, wherein the second cooling jacket is connected to the middle conduit; and an outlet conduit connected to the second cooling jacket and the first coolant return header.

Aspect A6 is the process of any of Aspects A2 to A5, wherein flowing coolant from the first coolant supply header to the first coolant return header via the first plurality of coolant passes comprises: flowing coolant from the first coolant supply header to the inlet conduit; flowing coolant through the inlet conduit to the first cooling jacket; flowing coolant through the first cooling jacket to the middle conduit; flowing coolant through the middle conduit to the second cooling jacket; flowing coolant through the second cooling jacket to the outlet conduit; and flowing coolant from the outlet conduit to the first coolant return header.

Aspect A7 is the process of any of Aspects A2 to A6, where coolant flows from a bottom of the first cooling jacket to a top of the first cooling jacket, and wherein coolant flows from a top of the second cooling jacket to a bottom of the second cooling jacket.

Aspect A8 is the process of any of Aspects A2 to A7, wherein a diameter of the inlet conduit, a diameter of the middle conduit, and a diameter of the outlet conduit of each of the first plurality of coolant passes are about equal.

Aspect A9 is the process of any of Aspects A2 to A8, wherein the inlet conduit and the outlet conduit of each of the first plurality of coolant passes are parallel to one another, wherein a longitudinal axis of the inlet conduit of each of the first plurality of coolant passes extends at an angle in the range of 1°-179° with respect to a longitudinal axis of the first coolant supply header, and wherein a longitudinal axis of the outlet conduit of each of the first plurality of coolant passes extends at an angle in the range of 1°-179° with respect to a longitudinal axis of the first coolant return header.

Aspect A10 is the process of any of Aspects A2 to A9, wherein i) a flow of coolant through the first cooling jacket and through the second cooling jacket of each of the first plurality of coolant passes is co-current or counter-current with respect to a flow of reaction mixture in the plurality of vertical legs of the loop slurry reactor; ii) the flow of coolant through the first cooling jacket and through the second cooling jacket of each of the first plurality of coolant passes is only counter-current with respect to the flow of reaction mixture in the plurality of vertical legs of the loop slurry reactor; or iii) a flow of coolant through the first cooling jacket and through the second cooling jacket of each of the first plurality of coolant passes is only co-current with respect to a flow of reaction mixture in the plurality of vertical legs of the loop slurry reactor.

Aspect A11 is the process of Aspect A2, further comprising: flowing coolant to a second coolant supply header extending along the second side of the loop slurry reactor; flowing coolant from a second coolant return header extending along the first side of the loop slurry reactor; and flowing coolant from the second coolant supply header to the second coolant return header via a second plurality of coolant passes; wherein each of the second plurality of coolant passes is configured to i) exchange heat with a second pair of the plurality of vertical legs, ii) receive coolant from the second coolant supply header on the second side of the loop slurry reactor, and iii) return coolant to the second coolant return header on the first side of the loop slurry reactor.

Aspect A12 is the process of Aspect A11, wherein coolant flows to the second coolant supply header by approach to the third side of the loop slurry reactor, wherein coolant flows from the second coolant return header away from the fourth side of the loop slurry reactor.

Aspect A13 is the process of Aspect A11 or A12, wherein each of the second plurality of coolant passes comprises: an inlet conduit connected to the second coolant supply header; a first cooling jacket wrapped around at least a portion of one of the second pair of the plurality of vertical legs, wherein the first cooling jacket is connected to the inlet conduit; a middle conduit connected to the first cooling jacket; a second cooling jacket wrapped around at least a portion of another of the second pair of the plurality of vertical legs, wherein the second cooling jacket is connected to the middle conduit; and an outlet conduit connected to the second cooling jacket and the first coolant return header.

Aspect A14 is the process of any of Aspects A11 to A13, wherein a diameter of the inlet conduit, a diameter of the middle conduit, and a diameter of the outlet conduit of each of the first plurality of coolant passes are about equal.

Aspect A15 is the process of any of Aspects A11 to A14, wherein each of the inlet conduit and the outlet conduit of each of the first plurality of coolant passes are parallel to one another, wherein a longitudinal axis of the inlet conduit of each of the first plurality of coolant passes extends at an angle in the range of 1°-179° with respect to a longitudinal axis of the first coolant supply header, wherein a longitudinal axis of the outlet conduit extends at an angle in the range of 1°-179° with respect to a longitudinal axis of the first coolant return header.

Aspect A16 is the process of any of Aspects A11 to A15, wherein flowing coolant from the second coolant supply header to the second coolant return header via the second plurality of coolant passes comprises: flowing coolant from the second coolant supply header to the inlet conduit; flowing coolant through the inlet conduit to the first cooling jacket; flowing coolant through the first cooling jacket to the middle conduit; flowing coolant through the middle conduit to the second cooling jacket; flowing coolant through the second cooling jacket to the outlet conduit; and flowing coolant from the outlet conduit to the second coolant return header.

Aspect A17 is the process of any of Aspects A11 to A16, where coolant flows from a bottom of the first cooling jacket to a top of the first cooling jacket, and wherein coolant flows from a top of the second cooling jacket to a bottom of the second cooling jacket.

Aspect A18 is the process of any of Aspects A11 to A17, wherein flow of coolant through the first cooling jacket and through the second cooling jacket of each of the second plurality of coolant passes is only counter-current with respect to the flow of reaction mixture in the plurality of vertical legs of the loop slurry reactor.

Aspect B1 is a coolant distribution system for a plurality of vertical legs in a loop slurry reactor, wherein the loop slurry reactor has a first side opposite a second side and a third side opposite a fourth side, wherein the first side and the second side are perpendicular to the third side and the fourth side.

Aspect B2 is the system of Aspect B1, comprising: a first coolant supply header extending along the first side of the loop slurry reactor; a first coolant return header extending along the second side of the loop slurry reactor; and a first plurality of coolant passes; wherein each of the first plurality of coolant passes is configured to i) exchange heat with a first pair of the plurality of vertical legs, ii) receive coolant from the first coolant supply header on the first side of the loop slurry reactor, and iii) return coolant to the first coolant return header on the second side of the loop slurry reactor.

Aspect B3 is the system of Aspect B2, wherein each of the first plurality of coolant passes comprises: an inlet conduit connected to the first coolant supply header; a first cooling jacket wrapped around at least a portion of one of the first pair of the plurality of vertical legs, wherein the first cooling jacket is connected to the inlet conduit; a middle conduit connected to the first cooling jacket; a second cooling jacket wrapped around at least a portion of another of the first pair of the plurality of vertical legs, wherein the second cooling jacket is connected to the middle conduit; and an outlet conduit connected to the second cooling jacket and the first coolant return header.

Aspect B4 is the system of any of Aspects B2 to B3, wherein i) a diameter of the inlet conduit, a diameter of the middle conduit, and a diameter of the outlet conduit of each of the first plurality of coolant passes are about equal; or ii) each of the inlet conduit and the outlet conduit of each of the first plurality of coolant passes are parallel with one another, wherein a longitudinal axis of the inlet conduit of each of the first plurality of coolant passes extends at an angle in the range of 1°-179° with respect to a longitudinal axis of the first coolant supply header, and wherein a longitudinal axis of the outlet conduit of each of the first plurality of coolant passes extends at an angle in the range of 1°-179° with respect to a longitudinal axis of the first coolant return header.

Aspect B5 is the system of any of Aspects B2 to B4, wherein i) a flow of coolant through the first cooling jacket and through the second cooling jacket of each of the first plurality of coolant passes is co-current or counter-current with respect to a flow of reaction mixture in the plurality of vertical legs of the loop slurry reactor; ii) the flow of coolant through the first cooling jacket and through the second cooling jacket of each of the first plurality of coolant passes is only counter-current with respect to the flow of reaction mixture in the plurality of vertical legs of the loop slurry reactor; or iii) a flow of coolant through the first cooling jacket and through the second cooling jacket of each of the first plurality of coolant passes is only co-current with respect to a flow of reaction mixture in the plurality of vertical legs of the loop slurry reactor.

Aspect B6 is the system of any of Aspects B2, further comprising: a second coolant supply header extending along the second side of the loop slurry reactor; a second coolant return header extending along the first side of the loop slurry reactor; and a second plurality of coolant passes, wherein each of the second plurality of coolant passes is configured to i) exchange heat with a second pair of the plurality of vertical legs, ii) receive coolant from the second coolant supply header on the second side of the loop slurry reactor, and iii) return coolant to the second coolant return header on the first side of the loop slurry reactor.

Aspect B7 is the system of Aspect B6, wherein each of the second plurality of coolant passes comprises: an inlet conduit connected to the second coolant supply header; a first cooling jacket wrapped around at least a portion of one of the second pair of the plurality of vertical legs, wherein the first cooling jacket is connected to the inlet conduit; a middle conduit connected to the first cooling jacket; a second cooling jacket wrapped around at least a portion of another of the second pair of the plurality of vertical legs, wherein the second cooling jacket is connected to the middle conduit; and an outlet conduit connected to the second cooling jacket and the second coolant return header.

Aspect B8 is the system of any of Aspects B6 to B7, wherein i) a diameter of the inlet conduit, a diameter of the middle conduit, and a diameter of the outlet conduit of each of the second plurality of coolant passes are about equal; or ii) each of the inlet conduit and the outlet conduit of each of the second plurality of coolant passes are parallel to one another, wherein a longitudinal axis of the inlet conduit extends at an angle in the range of 1°-179° with respect to a longitudinal axis of the first coolant supply header, wherein a longitudinal axis of the outlet conduit extends at an angle in the range of 1°-179° with respect to a longitudinal axis of the first coolant return header.

Aspect B9 is the system of any of Aspects B6 to B8, wherein the flow of coolant through the first cooling jacket and through the second cooling jacket of each of the second plurality of coolant passes is only counter-current with the flow of reaction mixture in the plurality of vertical legs of the loop slurry reactor.

Aspect C1 is a process for controlling temperature of a coolant in olefin polymerization, the process comprising: flowing a temperature adjusted coolant through a first plurality of cooling jackets and then a second plurality of cooing jackets to form a warmed coolant, wherein the first plurality of cooling jackets and the second plurality of cooling jackets are placed around a plurality of vertical legs of a loop slurry reactor; flowing the warmed coolant from the second plurality of cooling jackets to a heat exchanger; cooling the warmed coolant in the heat exchanger to form a cooled coolant; passing the cooled coolant through a steam heater to form the temperature adjusted coolant; and flowing the temperature adjusted coolant to the first plurality of cooling jackets; wherein the heat exchanger and the steam heater are fluidly coupled to one another in series and not in parallel with respect to the direction of flow of the coolant through the heat exchanger and the steam heater.

Aspect C2 is the process of Aspect C1, wherein the steam heater is downstream of the heat exchanger with respect to a direction of flow of the coolant.

Aspect C3 is the process of any of Aspects C1 to C2, wherein the warmed coolant and the cooled coolant flow outside the loop slurry reactor in a single coolant flowpath containing the heat exchanger and the steam heater.

Aspect C4 is the process of any of Aspects C1 to C3, wherein all the warmed coolant flows from the second plurality of cooling jackets to the heat exchanger.

Aspect C5 is the process of any of Aspects C1 to C4, further comprising: heating the cooled coolant with the steam heater to form the temperature adjusted coolant; and heating the loop slurry reactor with the temperature adjusted coolant during startup of the loop slurry reactor until a polymerization temperature is reached in the loop slurry reactor.

Aspect C6 is the process of any of Aspects C1 to C5, further comprising: maintaining a temperature of the loop slurry reactor during steady state operation of the loop slurry reactor.

Aspect C7 is the process of any of Aspects C1 to C6, further comprising: determining a temperature of the cooled coolant is below a threshold value; and heating the cooled coolant with the steam heater to form the temperature adjusted coolant.

Aspect C8 is the process of any of Aspect C1 to C7, further comprising: determining a temperature of the cooled coolant is at or above a threshold value; and not heating the cooled coolant with the steam heater.

Aspect C9 is the process of any of Aspect C1 to C8, wherein the heat exchanger is configured to provide heat exchange contact between the warmed coolant and a second coolant.

Aspect C10 is the process of any of the Aspects C1 to C9, wherein the second coolant is cooling water.

Aspect C11 is the process of any of Aspects C1 to C10, further comprising: warming the second coolant in the heat exchanger by the heat exchange contact between the warmed coolant and the second coolant to form a warmed second coolant; and flowing the warmed second coolant to a supply of the second coolant.

Aspect C12 is the process of any of Aspects C1 to C11, further comprising: polymerizing an olefin in the loop slurry reactor, wherein the olefin comprises ethylene or propylene.

Aspect D1 is a temperature control system for a coolant in olefin polymerization, the temperature control system comprising: a coolant return conduit coupled to a first plurality of cooling jackets of a loop slurry reactor; a heat exchanger connected to the coolant return conduit and configured to cool warmed coolant received from the coolant return conduit to form a cooled coolant; a steam heater coupled to the heat exchanger and configured to i) heat the cooled coolant to form a temperature adjusted coolant, or ii) allow the cooled coolant to pass through without heating to form the temperature adjusted coolant; and a coolant supply conduit coupled to the steam heater and to a second plurality of cooling jackets of the loop slurry reactor, wherein the first plurality of cooling jackets are fluidly coupled to the second plurality of cooling jackets; wherein the heat exchanger and the steam heater are connected in series and not in parallel.

Aspect D2 is the system of Aspect D1 wherein the steam heater is downstream of the heat exchanger with respect to a direction of flow of the coolant.

Aspect D3 is the system of any of the Aspects D1 to D2, wherein the warmed coolant and the cooled coolant flow outside the loop slurry reactor in a single coolant flowpath containing the heat exchanger and the steam heater.

Aspect D4 is the system of any of Aspects D1 to D3, wherein all the warmed coolant flows from the first plurality of cooling jackets to the heat exchanger.

Aspect D5 is the system of any of Aspects D1 to D4, further comprising: a second coolant conduit connected to the heat exchanger and configured to supply a second coolant to the heat exchanger; and a third coolant conduit connected to the heat exchanger and configured to return the second coolant to a supply of the second coolant.

Aspect D6 is the system of any of Aspects D1 to D5, further comprising: a steam conduit connected to the steam heater.

Aspect D7 is the system of any of Aspects D1 to D6, wherein the heat exchanger comprises a plurality of heat exchange zones connected in series or connected in parallel.

Aspect D8 is the system of any of Aspects D1 to D7, further comprising: a control device configured to compare a temperature of the cooled coolant relative to a threshold value and actuate a valve to allow or disallow steam injection into the steam heater.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

What is claimed is:

1. A process for controlling temperature of a coolant in olefin polymerization, the process comprising:
flowing a temperature adjusted coolant through a first plurality of cooling jackets and then a second plurality of cooling jackets to form a warmed coolant, wherein the first plurality of cooling jackets and the second plurality of cooling jackets are placed around a plurality of vertical legs of a loop slurry reactor;
flowing the warmed coolant from the second plurality of cooling jackets to a heat exchanger;
cooling the warmed coolant in the heat exchanger to form a cooled coolant;
passing the cooled coolant through a steam injection heater to form the temperature adjusted coolant; and
flowing the temperature adjusted coolant to the first plurality of cooling jackets;
wherein the heat exchanger and the steam injection heater are fluidly coupled to one another in series and not in parallel with respect to the direction of flow of the coolant through the heat exchanger and the steam injection heater.

2. The process of claim 1, wherein the steam injection heater is downstream of the heat exchanger with respect to a direction of flow of the coolant.

3. The process of claim 1, wherein the warmed coolant and the cooled coolant flow outside the loop slurry reactor in a single coolant flowpath containing the heat exchanger and the steam injection heater.

4. The process of claim 1, wherein all the warmed coolant flows from the second plurality of cooling jackets to the heat exchanger.

5. The process of claim 1, further comprising:
heating the cooled coolant with the steam injection heater to form the temperature adjusted coolant; and
heating the loop slurry reactor with the temperature adjusted coolant during startup of the loop slurry reactor until a polymerization temperature is reached in the loop slurry reactor.

6. The process of claim 1, further comprising:
maintaining a temperature of the loop slurry reactor during steady state operation of the loop slurry reactor.

7. The process of claim 1, further comprising:
determining a temperature of the cooled coolant is below a threshold value; and
heating the cooled coolant with the steam injection heater to form the temperature adjusted coolant.

8. The process of claim 1, further comprising:
determining a temperature of the cooled coolant is at or above a threshold value; and
not heating the cooled coolant with the steam injection heater.

9. The process of claim 1, wherein the heat exchanger is configured to provide heat exchange contact between the warmed coolant and a second coolant.

10. The process of claim 9, wherein the second coolant is cooling water.

11. The process of claim 9, further comprising:
warming the second coolant in the heat exchanger by the heat exchange contact between the warmed coolant and the second coolant to form a warmed second coolant; and
flowing the warmed second coolant to a supply of the second coolant.

12. The process of claim 1, further comprising:
polymerizing an olefin in the loop slurry reactor, wherein the olefin comprises ethylene or propylene.

13. A temperature control system for a coolant in olefin polymerization, the temperature control system comprising:
a coolant return conduit coupled to a first plurality of cooling jackets of a loop slurry reactor;
a heat exchanger connected to the coolant return conduit and configured to cool warmed coolant received from the coolant return conduit to form a cooled coolant;
a steam injection heater coupled to the heat exchanger and configured to i) heat the cooled coolant to form a temperature adjusted coolant, or ii) allow the cooled coolant to pass through without heating to form the temperature adjusted coolant; and
a coolant supply conduit coupled to the steam injection heater and to a second plurality of cooling jackets of the loop slurry reactor, wherein the first plurality of cooling jackets are fluidly coupled to the second plurality of cooling jackets;
wherein the heat exchanger and the steam injection heater are connected in series and not in parallel.

14. The temperature control system of claim 13, wherein the steam injection heater is downstream of the heat exchanger with respect to a direction of flow of the coolant.

15. The temperature control system of claim 13, wherein the warmed coolant and the cooled coolant flow outside the loop slurry reactor in a single coolant flowpath containing the heat exchanger and the steam injection heater.

16. The temperature control system of claim 13, wherein all the warmed coolant flows from the first plurality of cooling jackets to the heat exchanger.

17. The temperature control system of claim 13, further comprising:

a second coolant conduit connected to the heat exchanger and configured to supply a second coolant to the heat exchanger; and a third coolant conduit connected to the heat exchanger and configured to return the second coolant to a supply of the second coolant.

18. The temperature control system of claim 13, further comprising:

a steam conduit connected to the steam injection heater.

19. The temperature control system of claim 13, wherein the heat exchanger comprises a plurality of heat exchange zones connected in series or connected in parallel.

20. The temperature control system of claim 13, further comprising:

a control device configured to compare a temperature of the cooled coolant relative to a threshold value; and actuate a valve to allow or disallow steam injection into the steam injection heater.

\* \* \* \* \*